(12) United States Patent
Munshi

(10) Patent No.: US 6,645,675 B1
(45) Date of Patent: *Nov. 11, 2003

(54) SOLID POLYMER ELECTROLYTES

(75) Inventor: M. Zafar A. Munshi, Missouri, TX (US)

(73) Assignee: Lithium Power Technologies, Inc., Manvel, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 09/388,741

(22) Filed: Sep. 2, 1999

(51) Int. Cl.[7] .................. H01M 10/40; H01M 6/18; H01M 4/66
(52) U.S. Cl. .............. 429/305; 429/306; 429/309; 429/310; 429/312; 429/313; 429/314; 429/316; 429/319; 429/320; 429/321; 429/322; 429/323; 429/233; 429/234; 429/162; 29/623.1; 29/623.5; 252/62.2
(58) Field of Search ................ 429/304–307, 429/309–314, 316, 317, 319–323, 188, 189, 233, 234, 162; 29/623.1, 623.5; 252/62.2

(56) References Cited

U.S. PATENT DOCUMENTS

| | | | |
|---|---|---|---|
| 3,734,876 A | 5/1973 | Chu | 260/33.6 |
| 4,164,068 A | 8/1979 | Shropshire et al. | 29/623.1 |
| 4,505,997 A | 3/1985 | Armand et al. | 429/192 |
| 4,583,285 A * | 4/1986 | Chatterjee et al. | 29/623.5 |
| 4,654,279 A | 3/1987 | Bauer et al. | 429/192 |
| 4,737,422 A | 4/1988 | Knight et al. | 429/192 |
| 4,792,504 A | 12/1988 | Schwab et al. | 429/192 |
| 4,794,059 A | 12/1988 | Hope et al. | 429/192 |
| 4,808,496 A | 2/1989 | Hope et al. | 429/192 |
| 4,830,939 A | 5/1989 | Lee et al. | 429/192 |

(List continued on next page.)

FOREIGN PATENT DOCUMENTS

| | | | |
|---|---|---|---|
| EP | 0379372 A | 7/1990 | H01M/6/18 |
| EP | 0390557 | 10/1990 | H01M/10/40 |

(List continued on next page.)

OTHER PUBLICATIONS

C. Capiglia, et al., "Effects on nanoscale SiO2 of the thermal and transport properties of solvent–free, poly(ethylene oxide) (PEO)–based polymer electrolytes," Solid State Ionics 118 (1–2), Mar. 1999, pp. 73–79.*

(List continued on next page.)

*Primary Examiner*—Randy Gulakowski
*Assistant Examiner*—Jonathan Crepeau
(74) *Attorney, Agent, or Firm*—Conley Rose, P.C.

(57) ABSTRACT

A wide range of solid polymer electrolytes characterized by high ionic conductivity at room temperature, and below, are disclosed. These all-solid-state polymer electrolytes are suitable for use in electrochemical cells and batteries. A preferred polymer electrolyte is a cationic conductor which is flexible, dry, non-tacky, and lends itself to economical manufacture in very thin film form. Solid polymer electrolyte compositions which exhibit a conductivity of at least approximately $10^{-3}$–$10^{-4}$ S/cm at 25° C. comprise a base polymer or polymer blend containing an electrically conductive polymer, a metal salt, a finely divided inorganic filler material, and a finely divided ion conductor. The new solid polymer electrolytes are combinable with various negative electrodes such as an alkali metal, alkaline earth metal, transition metal, ion-insertion polymers, ion-insertion inorganic electrodes, carbon insertion electrodes, tin oxide electrode, among others, and various positive electrodes such as ion-insertion polymers and ion-insertion inorganic electrodes to provide batteries and supercapacitors having high specific energy (Wh/kg) (gravimetric) and energy density (Wh/l) (volumetric), high cycle life, low self-discharge and providing improved safety.

86 Claims, 3 Drawing Sheets

U.S. PATENT DOCUMENTS

| | | | |
|---|---|---|---|
| 4,911,995 A | 3/1990 | Bélanger et al. | 429/192 |
| 4,960,655 A | 10/1990 | Hope et al. | 429/192 |
| 4,970,012 A * | 11/1990 | Kuroda et al. | 252/182.27 |
| 4,990,413 A | 2/1991 | Lee et al. | 429/191 |
| 5,006,431 A | 4/1991 | Hope et al. | 429/192 |
| 5,019,467 A | 5/1991 | Fujiwara | 429/127 |
| 5,030,527 A | 7/1991 | Carpio et al. | 492/192 |
| 5,047,300 A | 9/1991 | Juergens | 429/94 |
| 5,057,385 A | 10/1991 | Hope et al. | 429/162 |
| 5,100,746 A | 3/1992 | Muller et al. | 429/94 |
| 5,102,752 A | 4/1992 | Hope et al. | 429/192 |
| 5,196,484 A | 3/1993 | Giles et al. | 525/314 |
| 5,238,759 A | 8/1993 | Plichta et al. | 429/192 |
| 5,281,682 A | 1/1994 | Cornforth et al. | 526/273 |
| 5,296,318 A | 3/1994 | Gozdz et al. | 429/192 |
| 5,360,684 A | 11/1994 | Duval et al. | 429/162 |
| 5,415,948 A | 5/1995 | Gauthier et al. | 429/62 |
| 5,423,110 A | 6/1995 | Gauthier et al. | 29/2 |
| 5,516,339 A | 5/1996 | Bailey | 29/623.1 |
| 5,521,023 A | 5/1996 | Kejha et al. | 429/142 |
| 5,521,028 A | 5/1996 | Gauthier et al. | 429/234 |
| 5,552,239 A | 9/1996 | Gozdz et al. | 429/94 |
| 5,631,103 A | 5/1997 | Eschbach et al. | 429/192 |
| 5,639,573 A | 6/1997 | Oliver et al. | 429/190 |
| 5,695,873 A | 12/1997 | Kumar et al. | 428/325 |
| 5,705,084 A * | 1/1998 | Kejha | 252/62.2 |
| 5,741,609 A * | 4/1998 | Chen et al. | 29/623.4 X |
| 5,910,378 A * | 6/1999 | Debe et al. | 429/42 |
| 6,001,509 A | 12/1999 | Kim et al. | 429/309 |
| 6,007,935 A | 12/1999 | Gauthier et al. | 429/66 |
| 6,030,421 A | 2/2000 | Gauthier et al. | 29/623 |
| 6,159,638 A | 12/2000 | Takatera et al. | 429/309 |

FOREIGN PATENT DOCUMENTS

| | | | |
|---|---|---|---|
| EP | 0411693 | 2/1991 | C08K/3/00 |
| EP | 0741426 | 11/1996 | H01M/4/04 |
| EP | 0766329 | 4/1997 | H01M/6/18 |
| EP | 0 893 836 A2 | 1/1999 | H01M/6/18 |
| EP | 0 986 122 A2 | 3/2000 | H01M/6/18 |
| GB | 2 326 269 | 12/1998 | H01M/10/00 |
| JP | 07082450 | 3/1995 | C08L/33/00 |
| WO | WO 99/27593 | 6/1999 | H01M/4/64 |

OTHER PUBLICATIONS

Doddapaneni, Narayan, "Technology Assessment of Ambient Temperature Rechargeable Lithium Batteries for Electric Vehicle Applications," report form Sandia National Laboratories for the U.S. Department of Energy, Washington, D.C. (Jul. 1991), DE91–016500, pp. 3, 5, 7, 35, and 37 excerpt.

Armstrong, R.D. et al., "Conductivity Cell for Temperature Cycling of Polymer Electrolytes," Solid State Ionics 11, North Holland, Amsterdam (1984), pp. 301–303 (Month n/a).

Armand, M.B., "Ionically Conductive Polymers," Solid State Batteries Eds. A Hooper and C.A.C. Sequeira, NATO ASI Series, Martinus Nijhoff Publishers, Dordrect, The Netherlands (1985), pp. 63–75 (Month n/a).

Johnson, W.B. et al., "Electrochemical Cell Investigations of $Li_xTiS_2$ and $Li_xNa_yTiS_2$ Using a Polymer Electrolyte," Solid State Ionics 5, North Holland, Amsterdam (1981), pp. 367–370 (Month n/a).

Munshi, M.Z.A. et al., "Assessment of Thin Film Batteries Based on Polymer Electrolytes. I. Energy Density," Solid State Ionics 38, North–Holland, Amsterdam (1990), pp. 87–94 (Month n/a).

Owens, B.B. et al., "Ambient Temperature Solid State Batteries," $8^{th}$ Annual International Conference on Solid State Ionics, Lake Louise, Banff, Canada (Oct. 1991), 18 pages.

Prasad, P.S.S. et al., "Ambient Temperature Solid Polymer Electrolyte Devices," 7th Annual International Conference on Solid State Ionics, Hakone, Japan (1989), 19 pages (Month n/a).

Croce, F. et al., "Characteristics of a poly(ethylene oxide)–$LiBF_4$ polymer electrolyte," J. Applied Electrochem. 18 (1988), pp. 401–404 (Month n/a).

Abraham, K.M. et al., "Dimensionally Stable MEEP–Based Polymer Electrolytes and Solid–State Lithium Batteries," report from Office of Naval Research, Contract No. N00014–87–C–0857, R&T Code: 400o010 sbi01, Final Report, Studies of the Fundamentals of Solid State Batteries, EIC Laboratories, Inc., Norwood, MA (Nov. 1990), AD–A228772, pp. 1–29.

Einset, A.G. and G.E. Wnek "Polymer Electrolyte Review," Chapter 15 in the Handbook of Solid State Batteries and Capacitors, Ed. M. Z. A.Munshi (World Scientific Pub. Singapore) 1995. (No month).

Naoi, K. and M.Z.A. Munshi "Modeling of Conducting Polymer Batteries and Capacitors," Chapter 17 in the Handbook of Solid State Batteries and Capacitors, Ed. M. Z. A.Munshi (World Scientific Pub. Singapore) 1995. (No month).

Doddapaneni, N., G. Nagasubramanian and D. Ingersoll "Solid–State Rechargeable Lithium Batteries for Electric Vehicle Applications," Chapter 18 in the Handbook of Solid State Batteries and Capacitors, Ed. M. Z. A.Munshi (World Scientific Pub. Singapore) 1995. (No month).

Munshi, M.Z.A. "Technology Assessment of Lithium Polymer Electrolyte Secondary Batteries," Chapter 19 in the Handbook of Solid State Batteries and Capacitors, Ed. M. Z. A.Munshi (World Scientific Pub. Singapore) 1995. (No month).

Munshi, M.Z.A., and Owens, B.B., "Assessment of Thin Film Batteries Based on Polymer Electrolytes. I. Energy Density," Solid State Ionics, vol. 38, pp. 87–94, 1990, North Holland. (No month).

Munshi, M.Z.A., and Owens, B.B., "Assessment of Thin Film Batteries Based on Polymer Electrolytes. II. Pulse Power Density," Solid State Ionics, vol. 38, pp. 95–101, 1990, North Holland. (No month).

Munshi, M.Z.A., Owens, B.B., "Assessment of Thin Film Batteries Based on Polymer Electrolytes. III. Specific Energy Versus Specific Power," Solid State Ionics, vol. 38, pp. 103–107, 1990, North Holland. (No month).

Visco, Steven J. and DeJonghe, Lutgard C., "Advanced Batteries Based on Organosulfur Redox Chemistry," Handbook of Solid State Batteries and Capacitors: Ed. M.Z.A. Munshi, Ch. 22, World Scientific, Singapore, 1995. (No month).

Kumar B. et al: Polymer–Ceramic Composite Electrolytes; Journal of Power Sources, Elsevier Sequoia S.A. Lausanne, CH, vol. 52, No. 2, Dec. 1, 1994, pp. 261–268 XP004044634 ISSN: 0378–7753.

F. Capuano and Al: *Composite Polymer Electrolytes*, Journal of Electrochemical Society, vol. 138, No. 7, 1991, pp. 1918–1922, XP002175399 (No month).

Krawiec W et al: *Polymer Nanocomposites: A New Strategy for Synthesizing Solid Electrolytes for Rechargeable Lithium Batteries*, Journal of Power Sources, Elsevier Sequoia S.A. Lausanne, CH, vol. 54, No. 2, Apr. 1, 1995, pp. 310–315 XP004044428 ISSN: 0378–7753.

PCT Search Report—PCT/US00/22915, Published as WO 01/17051, Mar. 8, 2001.

\* cited by examiner

SOLID POLYMER ELECTROLYTES

CROSS-REFERENCE TO RELATED APPLICATIONS

This application is related to contemporaneously filed U.S patent application Ser. No. 09/388,733 entitled "All-Solid-State Electrochemical Device and Method of Manufacturing," the disclosure of which is incorporated herein by reference.

STATEMENT REGARDING FEDERALLY SPONSORED RESEARCH OR DEVELOPMENT

Not Applicable

BACKGROUND OF THE INVENTION

1. Field of the Invention

The present invention generally relates to the manufacture of solid state polymer electrolytes. More particularly, the invention relates to highly conductive thin lithium polymer electrolyte structures and the methods by which they are made. The invention also relates to methods of manufacturing all-solid-state electrochemical cells based on such electrolytes.

2. Description of the Related Art

Throughout the world there are ongoing efforts to develop an all solid state, rechargeable, high energy density battery using a thin polymer film as the electrolyte. Since the concept of such a battery, based on the use of polyethylene oxide/lithium salt complexes, was first discussed in 1979 by Armand et al. in Fast Ion Transport in Solids (eds. P. Vashista et al., North-Holland, Amsterdam, p.131), development has mainly centered around rechargeable systems utilizing intercalation/insertion compounds. Some of the more recent work has focused on designing novel polymers with higher ionic conductivities at ambient temperature. Solid state battery and capacitor technology, including the evolution of polymer electrolytes, is discussed in the Handbook of Solid State Batteries & Capacitors, M. Z. A. Munshi, ed., World Scientific Publishing, Inc., Singapore, which is incorporated herein by reference.

At the present time, the state-of-the-art lithium battery is a lithium ion battery which uses a carbon electrode as the negative electrode or anode and a lithiated metal oxide, such as lithiated cobalt oxide, lithiated nickel oxide, lithiated manganese oxide, or mixtures of these materials as the positive electrode or cathode, a microporous polypropylene or polyethylene separator that separates the two electrodes and prevents them from shorting electrically, and liquid organic solvents containing a lithium salt as the electrolyte. The electrolyte is usually absorbed into the separator material and provides high ionic conductivity ($10^{-3}$ to $10^{-2}$ S/cm) and migration of ions between the electrodes of the cell. An offshoot of the lithium ion battery is the lithium ion polymer electrolyte battery. The electrode chemistry of this battery is the same; however in this case the liquid electrolyte (up to 70% by weight of the electrolyte) is absorbed in a polymer membrane instead of the microporous polypropylene separator.

Another type of rechargeable lithium battery system sometimes used today employs a lithium metal anode. Secondary batteries using lithium metal as the negative electrode, intercalation or insertion compounds as the positive electrode, and non-aqueous organic electrolytes were the focus of intense investigation during the 1970's and 1980's. One problem, however, with using lithium in a rechargeable system is that because of the instability of lithium in these solvents, a large excess of lithium is required to off-set the chemical reaction of lithium with the solvent, usually as much as 3 to 5 times more lithium capacity than the cathode capacity. In addition, the liquid solvent electrolyte employed in any of the above-described cell systems is often corrosive and toxic, and presents handling difficulties due to spillage or leakage from the cell. Liquid solvent electrolyte can also release gas, or outgas, during overcharge or overdischarge or at elevated temperatures, leading to safety problems.

In order to overcome the disadvantages inherent in liquid electrolytes and to obtain better long-term storage stability there is interest in developing solid polymeric electrolytes in which ion mobility is achieved through coordination by sites on the polymer chain of electrolyte ions, thus promoting electrolyte dissolution and salt dissociation. An all-solid-state battery using an ionically conductive polymer membrane as the electrolyte would have several attractive features. It could be made into virtually any shape and size, be reasonably rugged and leakproof, and have low self-discharge. It could be made into thin film power cells or thick film energy cells, would have high open-circuit potentials using a lithium anode, and could be produced by automated fabrication techniques. These features represent a unique combination of properties and give rise to the possibility of using such batteries, as either secondary or primary devices across a wide range of applications.

In an attempt to develop all-solid-state polymer electrolyte, one polymer that has been examined extensively is polyethylene oxide (PEO), which is able to form stable complexes with a number of salts. Because of its low ionic conductivity at ambient temperature of approximately $10^{-9}$ to $10^{-8}$ S/cm, batteries examined using this material had to operate at 100° C. and above. A major problem with PEO based electrolytes at temperatures below 60° C. is their high crystallinity and the associated low ion mobility. In recent years a number of radically different approaches have been taken to improve the conductivity of PEO and PEO-based polymers that have also led to the proposal of other polymers. These approaches included polymer modifications and synthesizing new polymers; forming composite polymers with ceramic materials; using plasticizer salts to increase the ion transport and mobility of the cation; using plasticizing solvents in the polymer again to increase the ionic character of the cation; among other approaches. Several review articles describe these approaches in detail, e.g. "Technology Assessment of Lithium Polymer Electrolyte Secondary Batteries" by M. Z. A. Munshi, Chapter 19 in Handbook of Solid State State Batteries and Capacitors, Ed. M. Z. A. Munshi (World Scientific Pub. Singapore) 1995; A. Hooper, M. Gauthier, and A. Belanger, in: "Electrochemical Science and Technology of Polymers—2, Ed. R. G. Linford (Elsevier Applied Science, London), 1987.

Polymer modification and synthesis of new polymers resulted in some improvement in the ionic conductivity but the mechanical property and integrity were poor. Probably, the best known polymer as a result of this synthesis is poly(bis(methoxyethoxyethoxide))-phosphazene, known as MEEP, which has an ionic conductivity of approximately $10^{-5}$ S/cm at room temperature when combined with a lithium salt, but which has glue-like mechanical properties. On the other hand, materials based on blocked copolymers may provide alternatives. For example, PEO-PPO-PEO crosslinked with trifunctional urethane and a lithium salt has an ionic conductivity of approximately $10^{-5}$ S/cm but is too rigid, brittle and difficult to manufacture.

Inorganic conducting and non-conducting fillers have also been used to increase the ionic conductivity and mechanical property of the polymer. Addition of alpha alumina to $(PEO)_8 \cdot LiClO_4$ in resulted in a negligible effect on the ionic conductivity but dramatically increased the mechanical property at 100° C., while the addition of other ceramic materials such as ionically conductive beta alumina to PEO-NaI and PEO-LiClO$_4$ complexes improved the ionic conductivity of PEO based electrolytes to approximately $10^{-5}$ S/cm. In another battery technology, inorganic fillers based on high surface area alumina and silica have been used to enhance the ionic conductivity of lithium iodide solid electrolyte from $10^{-7}$ S/cm to $10^{-5}$–$10^{-4}$ S/cm at room temperature (see C. C. Liang, *J. Electrochemical Society*, Vol. 120, page 1289 (1973)). Plasticizer salts based on lithium. bis(trifluoromethane sulfonyl)imide, $LiN(CF_3SO_2)_2$ trademarked as LiTFSI by Hydro-Quebec and distributed by the 3M Company under the product name, HQ-115 when added to PEO yields a conductivity of about $10^{-5}$ S/cm.

None of the previous approaches toward improving polymer conductivity has resulted in adequate conductivity enhancements of the polymer electrolytes to permit room temperature operation of batteries utilizing the electrolyte. Accordingly, an attempt was made to increase the ionic conductivity of PEO-based polymer electrolyte by incorporating plasticizing solvents or low molecular weight polymers to the polymer electrolyte. The intent was to increase the ionic mobility and concentrations of the charge carriers in the solid polymer electrolyte by enhancing the dissociation of the lithium salt. Generally, it is believed that the lithium ion is also solvated to the solvent molecule and participates in enhancing the ionic mobility. Many electrolyte composites incorporating low molecular weight polymers or liquid organic solvents have been prepared and have demonstrated high room temperature conductivity approaching those of the typical non-aqueous liquid electrolytes. For example, Kelly et al. (*J Power Sources*, 14:13 (1985)) demonstrate that adding 20 mole percent of liquid polyethylene glycol dimethyl ether polymer (PEGDME) to solid PEO polymer results in an increase in the ionic conductivity of the final plasticized polymer from $3 \times 10^{-7}$ S/cm to $10^{-4}$ S/cm at 40° C. However, the mechanical property of this material was very poor.

Bauer et al in U.S. Pat. No. 4,654,279 (1987) demonstrate that thermal crosslinking of polymers consisting of epoxies and methacrylates and plasticized with a solution of LiClO$_4$ in a 400 MW PEG resulted in a conductivity of $4 \times 10^{-4}$ S/cm at 25° C. This patent describes a polymeric electrolyte consisting of a two phase interpenetrating network (IPN) of a mechanically supporting phase of a continuous network of a cross-linked polymer and an ionically conducting phase comprising of a metal salt and a liquid polymer such as liquid PEG.

Many of these low molecular weight polymers have a relatively low dielectric constant when compared to their liquid solvent counterpart, and thus limit the number of charge carriers in the plasticized polymer. In an effort to overcome this hindrance, high dielectric constant liquid organic solvent such as ethylene carbonate (EC) and propylene carbonate (PC) have been incorporated in the host polymer both to increase the number of charge carriers and increase further the room temperature conductivity of the polymer. The use of these organic solvents to plasticize polymers such as poly(vinyl acetal), poly(acrylonitrile), poly(vinyl acetate) and hexafluoropropenevinylidene fluoride copolymer (Viton™) were made as early as 1975 by Feuillade and Perche (*Journal of Applied Electrochemistry*, Vol. 5, page 63 (1975)). However, the mechanical properties of these polymers were so poor that they had to be supported on porous matrices. Later Armand (*Proc. Workshop on Li Non-Aqueous Battery Electrochemistry, The Electrochemical Soc.* Vol. 80–7, page 261 (1980)) produced a system with good room temperature conductivity ($10^{-4}$ S/cm) and good mechanical properties by crosslinking Viton™ and plasticizing with a solution of 1M LiClO$_4$ in PC. Polyvinylidene fluoride (PVDF) and polyacrylonitrile (PAN) were evaluated in the early 1980s and have also been doped with a variety of liquid polar solvents, yielding room temperature conductivities as high as $10^{-3}$ S/cm. Subsequently, PVDF has been the subject of a recent patent from Bellcore (U.S. Pat. No. 5,296,318).

The use of PC in an ionically conductive matrix containing oxygen donor atoms such as PEO complexed with a lithium salt was first presented by the present inventor in a paper presented at the Fall Meeting of the Electrochemical Soc. held Oct. 18–23, 1987. Although room temperature battery performance data was presented at that time, the propylene carbonate/lithium salt/polymer electrolyte did not have good mechanical properties. In the late 1980's through early 1990's, a series of U.S patents including U.S. Pat. Nos. 4,792,504; 4,747,542; 4,792,504; 4,794,059; 4,808,496; 4,816,357; 4,830,939; 4,861,690; 4,925,751; 4,925,752; 4,935,317; 4,960,655; 4,990,413; 4,997,732; 5,006,431; 5,030,527; 5,057,385; 5,066,554 and European patents EP 0 359 524 and EP 0 411 949 were issued variously to MHB Inc. and Hope Industries. These patents generally relate to the use of liquid organic solvents in various types of polymeric materials including PEO, materials based on acrylates, and low MW PEG acrylates. These patents described predominantly radiation curing methods for the preparation of interpenetrating polymeric networks containing various types of polyacrylates and liquid organic solvents. Although electron beam curing was the preferred method for polymerizing the IPN, thermal and ultraviolet curing methods were also proposed. The idea behind this was to contain the PC solution in the matrix of the polymeric network that would therefore yield a high ionic conductivity comparable to that of PC itself. Indeed, this was demonstrated in typical polymeric networks, yielding conductivities of about $2 \times 10^{-3}$ S/cm at room temperature. An advantage with using electron beam curing compared to UV radiation is that an electron beam can penetrate through metallic components, and hence complete prototype cells can be made in-situ.

While the addition of organic plasticizers may help solver the problem of low ionic conductivity in polymer electrolytes, they necessarily introduce additional electrolyte components that may have deleterious effects on other electrolyte properties, such as stability in contact with metallic lithium. Like the liquid organic electrolytes, plasticized polymer electrolyte is not thermodynamically stable at the lithium metal potential. In addition, polymer electrolytes based on such designs cannot be manufactured in very thin film form so as to reduce their overall resistance and hence cell resistance, since the polymer will not have the sufficient strength to hold the liquid organic solvents in its matrix. For such a system to be fully functional it must be based on a thick film concept, which increases its overall cell resistance and reduces the energy density due to a reduction in the active components in the cell. Another problem with this type of design is the fact that polymers containing liquids cannot be wound along with the rest of the electrode components in a winding machine, since the liquid will tend to ooze out of the polymer as soon as any stress is applied to the polymer.

All of the prior art techniques that have been employed to improve the ionic conductivity, mechanical strength, safety, and chemical stability, and to reduce cost by simplifying or improving the synthesis of polymer electrolytes have serious shortcomings. As a result, there is still no room temperature conducting polymer electrolyte available today that is entirely suitable for use with a lithium metal anode in a rechargeable lithium battery. There remains a need for solid polymer electrolytes with better ionic conductivity at room temperature and below so that the performance of an electrochemical cell at room temperature, or below room temperature, can be improved. There is also a great need for thinner components for batteries that avoid the use of organic solvents in the electrolyte without sacrificing energy density.

SUMMARY OF THE INVENTION

The solid polymer electrolytes and electrochemical cells of the preferred embodiments of the present invention solve many of the problems and disadvantages described above. The all-solid-state polymer electrolytes offer distinct advantages over prior polymer electrolytes. Some of these advantages include an all-solid-state composition containing no liquid organic solvents, and characterized by high stability with increased temperature. These electrolytes are also mechanically stronger than previous polymer electrolyte compositions, and for the first time provide a commercially feasible solid polymer electrolyte with good ionic conductivity at room temperature and below. Another advantage of many of the new polymer electrolyte compositions of the invention is that they can be manufactured in ultra-thin film form, are non-tacky, are pin-hole free, and provide low resistance and excellent conformal and flexible design capability. A particular advantage of certain solid lithium polymer electrolyte compositions of the invention is chemical stability, which permits their use with lithium metal as the anode of a polymer electrolyte battery. Lithium polymer electrolyte batteries constructed from the new polymer electrolyte compositions can be used in any orientation, a quality that is not possible today with conventional lithium batteries. Still another advantage of the preferred all-solid-state polymer electrolytes of the invention is that as a result of their solid state they are tolerant to overcharge when used in a solid state lithium polymer electrolyte battery. Since there is no liquid solvent within the solid polymer electrolyte, overcharge of batteries using the new solid polymeric electrolytes does not involve any gassing reactions. Instead the polymer merely degrades to a crystalline deposit. Hence, batteries constructed from such solid polymer electrolytes are safer than their liquid electrolyte counterparts.

In accordance with the present invention, a solid polymer electrolyte having a conductivity greater than $1 \times 10^{-4}$ S/cm at 25° C. or below is provided. The solid polymer electrolytes comprise a mixture of a base polymer material comprising at least one ionically conductive polymer and having an initial conductivity of at least about $1 \times 10^{-5}$ S/cm at 25° C. when combined with a metal salt; a metal salt, an inorganic filler having an average particle size less than 0.05 micron in diameter and a surface area of at least about 100 $m^2/g$; and an ionic conducting material having an average particle size less than 0.1 micron in diameter and an initial ionic conductivity of at least $2 \times 10^{-3}$ S/cm at 25° C. Preferably the electrolyte is a cationic conductor or has cationic mobility, and the metal salt is a sodium, lithium, potassium, magnesium or calcium salt, more preferably lithium. In certain embodiments, the salt is a lithium salt. Preferred lithium salts include lithium hexafluorophosphate ($LiPF_6$), lithium perchlorate ($LiClO_4$), lithium tetrafluoroborate ($LiBF_4$), lithium hexafluoroarsenate ($LiAsF_6$), lithium tetrachloroaluminate ($LiAlCl_4$), lithium trifluoromethanesulfonate ($LiCF_3SO_3$), lithium methide ($LiC(SO_2CF_3)_3$) and lithium bis(trifluoromethane sulfonyl)imide ($LiN(CF_3SO_2)_2$ or lithium imide). It is preferred that the lithium salt is a plasticizer salt.

Some embodiments of the solid polymer electrolyte comprise about 30 to 95% (by weight of solid polymer electrolyte) of the base polymer material; about 1 to 25% (by weight of solid polymer electrolyte) of the metal salt; about 0.1–60% (by volume of solid polymer electrolyte) of the inorganic filler; and about 0.1–60% (by volume of solid polymer electrolyte) of the ionic conducting material. In some of the preferred embodiments, the amount of the inorganic filler is about 0.1–20% (by volume of solid polymer electrolyte), and the concentration of the ionic conducting material is about 0.1–20% (by volume of solid polymer electrolyte).

In certain embodiments of the solid polymer electrolytes the metal salt is a plasticizer lithium salt, the inorganic filler is fumed silica or alumina, and a glassy lithium ion conductor or a ceramic lithium ion conductor is employed. The lithium ion conducting material may be a sulfide glass, lithium beta alumina, a lithium silicate, lithium phosphorus oxynitride ($Li_3PO_4$), or another phosphate glass in some of the more preferred embodiments of the solid polymer electrolytes.

In some embodiments the base polymer material comprises at least two polymers, the first of which is an ionically conductive polymer. An ionically conductive polymer is one in which the monomers contain a hetero atom with a lone pair of electrons available for the metal ions of a metal salt to attach to and move between during conduction, when the polymer is mixed with a metal salt. In such a polymer, movement of the metal ion from one lone electron pair site to another during the conduction process is facilitated. The first polymer is a linear polymer, a random copolymer, a block copolymer, a comb-branched block copolymer, a network structure, a single ion conductor, a polyvinylidene fluoride or chloride or copolymer of their derivatives, poly (chlorotrifluoroethylene), poly(ethylene-chlorotrifluoroethylene), or poly(fluorinated ethylene-propylene) in some of the preferred embodiments of the solid polymer electrolytes. In certain embodiments, the first polymer is chosen from the group consisting of polyethylene oxide (PEO), oxymethylene linked PEO, PEO-PPO-PEO crosslinked with trifunctional urethane; poly(bis(methoxy-ethoxy-ethoxide))-phosphazene (MEEP); a triol-type PEO crosslinked with difunctional urethane, poly((oligo)oxyethylene) methacrylate-co-alkali metal methacrylate; polyacrylonitrile (PAN), polymethylmethacrylate (PNMA), polymethylacrylonitrile (PMAN); polysiloxanes and their copolymers and derivatives, polyvinylidene fluoride or chloride and copolymers of their derivatives, poly(chlorotrifluoro-ethylene), poly(ethylene-chlorotrifluoroethylene), poly(fluorinated ethylene-propylene), acrylate-based polymer, other similar solvent-free polymers, combinations of the foregoing polymers either condensed or crosslinked to form a different polymer, and physical mixtures of any of the foregoing polymers, provided that the polymer or polymer mixture is combinable with a lithium salt such that the ionic conductivity of the first polymer is enhanced compared to its conductivity when not combined with the lithium salt.

In some embodiments of the solid polymer electrolyte the second polymer is more inert with respect to ionic conductivity and is stronger than the first polymer when each polymer is in the form of a thin film. Some suitable polymers for the second polymer include polyester (PET), polypropylene (PP), polyethylene napthalate (PEN), polyvinylidene fluoride (PVDF), polycarbonate (PC), polyphenylene sulfide (PPS), polytetrafluoroethylene (PTFE), or another polymer that has thermodynamic stability and strength characteristics similar to one of the foregoing polymers.

Certain of the solid polymer electrolytes contain a base polymer material comprising about 1% to 99% (by weight of base polymer material) of one polymer and the remainder of the base polymer material comprises at least one other polymer.

In some embodiments, the base polymer material of the solid polymer electrolyte is dimensionally stable up to at least 150° C. Some embodiments of the solid polymer electrolyte include a polymer with a non-linear molecular-structure and the electrolyte has a resilient, amorphous structure, providing a mechanically stronger product than prior art polymer electrolyte compositions. The solid polymer electrolyte may be in the form of a 0.2 to 100 micron thick film, preferably 0.2 to 10 micron, and more preferably 0.2 to 3 micron thick. Such ultra-thin polymer electrolyte films are characterized by a resistance of no more than about 1 $\Omega/cm^2$ when employed as a thin-film electrolyte in an electrochemical cell.

One chemically stable solid polymer electrolyte especially suited for use with a lithium metal anode of a polymer electrolyte battery comprises about 30 to 95% (by weight of solid polymer electrolyte) base polymer material comprising at least one ionically conductive polymer and having an initial conductivity of at least about $10^{-5}$ S/cm at 25° C. when combined with a lithium salt; about 1 to 25% (by weight of the solid polymer electrolyte) lithium salt; about 0.1–60% (by volume of the solid polymer electrolyte) inorganic filler having an average particle size less than 0.05 micron in diameter and a surface area of at least about 100 $m^2/g$; and about 0.1–80% (by volume of the solid polymer electrolyte) lithium ion conducting material having an average particle size less than 0.1 micron in diameter and an initial ionic conductivity of at least $2\times10^{-3}$ S/cm at 25° C. All solid state lithium-based cells employing this electrolyte use less lithium in the cell than conventional lithium ion cells, therefore reducing cost and increasing energy content.

Preferred base polymer materials for a solid polymer electrolyte have a conductivity of at least about $5\times10^{-5}$ S/cm at 25° C. or below when combined with a metal salt, and contain at least two polymers, the first of which is an ionically conductive polymer. In preferred embodiments, the monomers of this ionically conductive polymer have a hetero atom with a lone pair of electrons available for the metal ions of a metal salt to attach to and move between during conduction, when the first polymer is mixed with a metal salt. The second polymer is preferably more inert with respect to ionic conductivity when combined with the metal salt and has greater strength than the first polymer, when each of the polymers is in the form of a thin film. In some embodiments the first polymer is chosen from the group consisting of linear polymers, random copolymers, block copolymers, comb-branched block copolymers, network structures, single ion conductors, polyvinylidene fluoride or chloride and copolymers of their derivatives, poly (chlorotrifluoroethylene), poly(ethylene-chlorotrifluoroethylene), and poly(fluorinated ethylene-propylene). The first polymer material may be polyethylene oxide (PEO), oxymethylene linked PEO, PEO-PPO-PEO crosslinked with trifunctional urethane; poly(bis(methoxy-ethoxy-ethoxide))-phosphazene (MEEP); a triol-type PEO crosslinked with difunctional urethane, poly((oligo)oxyethylene) methacrylate-co-alkali metal methacrylate; polyacrylonitrile (PAN), polymethylmethacrylate (PMMA), polymethylacrylonitrile (PMAN); polysiloxanes and their copolymers and derivatives, polyvinylidene fluoride or chloride and copolymers of their derivatives, poly(chlorotrifluoro-ethylene), poly(ethylene-chlorotrifluoroethylene), poly(fluorinated ethylene-propylene), acrylate-based polymer, or another solvent-free polymer or combination of the above polymers either condensed or crosslinked to form a different polymer or mixed physically. The polymer selected as the first polymer is combinable with a lithium salt such that the ionic conductivity of that polymer is enhanced.

In some embodiments of the base polymer material, the second polymer is chosen from the group consisting of polyester (PET), polypropylene (PP), polyethylene napthalate (PEN), polyvinylidene fluoride (PVDF), polycarbonate (PC), polyphenylene sulfide (PPS), polytetrafluoroethylene (PTFE), and other polymer materials that possess stability and strength characteristics similar to one of said group of polymers. The composition of the base polymer material may comprise about 1% to 99% (by weight of said base polymer material) of the first polymer with the remainder being at least one other second polymer.

Methods of manufacturing the new polymer electrolytes are also provided described herein. One method of making a solid polymer electrolyte having a conductivity greater than $1\times10^{-4}$ S/cm at 25° C. or below comprises mixing together a base polymer material containing at least one ionically conductive polymer. The base polymer or polymer blend has an initial conductivity of at least about $1\times10^{-5}$ S/cm at 25° C. when combined with a metal salt; a metal salt; an inorganic filler having an average particle size less than 0.05 micron in diameter and a surface area of at least about 100 $m^2/g$; an ion conducting material having an average particle size less than 0.1 micron in diameter and an initial ionic conductivity of at least $2\times10^{-3}$ S/cm at 25° C. The mixture may also include a liquid organic solvent for dissolving the polymer and salt, if necessary, depending on the choice of polymer, for instance. Also, a curing agent may be included in the mixture if a curable polymer is selected. The process may optionally include maintaining the temperature of the mixture at the melting point of the base polymer material. The process includes forming the mixture into a solid polymer electrolyte and, optionally, evaporating the liquid organic solvent if one has been employed in the mixture. Curing of the solid polymer electrolyte is another option, which may be included if a curable polymer has been employed. The process may include forming the mixture into a 0.2 to 100 microns thick solid polymer electrolyte film, preferably 0.2 to 10 microns thick, and more preferably 0.2 to 3 microns thick.

In certain embodiments of the method of making a solid polymer electrolyte the process includes preparing a polymer/salt intermediate composition containing said base polymer material and said metal salt. A portion or aliquot of the intermediate composition is then formed into an initial polymer/salt electrolyte and the conductivity is then determined. By determining a conductivity of at least $5\times10^{-5}$ S/cm at 25° C. for this initial polymer/salt electrolyte, the selection of a suitable polymer or polymer blend as the base polymer material for the solid polymer electrolyte is ensured.

In certain embodiments the method of preparing the solid polymer electrolyte also includes preparing a polymer/salt/filler intermediate containing the above-described polymer/salt intermediate composition and an inorganic filler having an average particle size less than 0.05 micron in diameter and a surface area of at least about 100 m$^2$/g. After forming an aliquot of this polymer/salt/filler intermediate into a solid, the conductivity is determined. Determining a conductivity of at least 1×10$^{-4}$ S/cm at 25° C. for an polymer/salt/filler intermediate offers the user a way to advantageously choose more desirable polymer/salt and filler compositions for a particular application.

Certain methods of making a solid polymer electrolyte include stamping the polymer/salt/filler/ionic conductor mixture onto a substrate. In certain other methods the process of making a solid polymer electrolyte includes adding a liquid organic solvent to the mixture, and evaporating the liquid organic solvent prior to optionally curing of the solid polymer electrolyte. In some of these solvent-based casting or coating methods, the process of forming the mixture into a solid polymer electrolyte may include employment of any of a variety of methods, including knife coaters, doctor blade coaters, wire-wound bar coaters (Mayer rods), air knife (air doctor) coaters, squeeze roll (kiss coaters), gravure coaters, reverse roll coaters, cast film coaters and transfer roll coaters. In preferred embodiments of these methods the solid polymer electrolyte has a final thickness of 0.2 to 100 microns.

A preferred embodiment of the method of making a solid polymer electrolyte includes fixing together about 30 to 95% (by weight of solid polymer electrolyte) base polymer material comprising at least one ionically conductive polymer and having an initial conductivity of at least about 10$^{-5}$ S/cm at 25° C. when combined with a metal salt; about 1 to 25% (by weight of the solid polymer electrolyte) metal salt; about 0.1–60% (by volume of the solid polymer electrolyte) inorganic filler having an average particle size less than 0.05 micron in diameter and a surface area of at least about 100 m$^2$/g; about 0.1–80% (by volume of the solid polymer electrolyte) ion conducting material having an average particle size less than 0.1 micron in diameter and an initial ionic conductivity of at least 2×10$^{-3}$ S/cm at 25° C. Depending on the base polymer material selected, the user may want to include a liquid organic solvent and a curing agent in the mixture.

Certain embodiments of the above-described methods omit liquid organic solvent in the mixture and maintain the temperature of the mixture at the melting point of the base polymer material. In this case, the solid polymer electrolyte may be formed by hot-melt resin casting to provide a final film thickness of about 2 to 4 microns and a final film width of about 20 to 30 inches. The solid polymer electrolyte may alternatively be formed by a hot-melt resin extrusion process, producing a final film thickness of about 2 to 25 microns. A polymer electrolyte membrane prepared by this method contains no liquid organic solvent and is characterized by its dry, non-tacky consistency and pin-hold free structure. Preferably this electrolyte employs a plasticizer salt and the final polymer electrolyte membrane is flexible. Preferably the membrane is also conformable so that it may be readily shaped or fitted into to the desired shape. In some embodiments of the manufacturing methods the polymer electrolyte mixture is hot-pressed or is subjected to hot-isostatic pressing to form the final electrolyte.

In some embodiments of the methods, the inorganic filler may be blended with the other ingredients of the mixture during extrusion of the mixture, and the preferred inorganic filler material is fumed silica or alumina.

In an alternative embodiment of a method of making a solid polymer electrolyte the process includes mixing together about 30–95% (by weight of solid polymer electrolyte) base polymer material comprising at least one ionically conductive polymer and having an initial conductivity of at least about 10$^{-5}$ S/cm at 25° C. when combined with a metal salt; about 1 to 25% (by weight of solid polymer electrolyte) metal salt; about 0.1–20% (by volume of solid polymer electrolyte) inorganic filler having an average particle size less than or equal to 0.01 micron in diameter and a surface area of at least about 100 m$^2$/g; about 0.1–80% (by volume of solid polymer electrolyte) ionic conducting material having an average particle size less than 0.1 micron in diameter and an initial ionic conductivity of at least 2×10$^{-3}$ S/cm at 25° C. Optionally, a liquid organic solvent, and optionally, a curing agent, to form a mixture. An anhydrous liquid organic solvent may be used in certain embodiments of the method. In some variations of the solvent-based methods, the step of forming the solid polymer electrolyte includes casting the mixture on an inert substrate and evaporating a solvent. Preferably the polymer electrolyte is about 0.5 to 25 microns in thickness in its final form. In some embodiments the method may also include curing the solid polymer electrolyte after liquid casting, and in some embodiments the curing is accomplished by applying ultraviolet or electron beam radiation to the electrolyte.

In certain preferred embodiments of a method of making a solid polymer electrolyte, about 30–95% base polymer, about 1–25% lithium salt, about 0.1–20% inorganic filler and about 0.1–80% sulfide glass or ceramic Li ion conducting material are included in the mixture, along with liquid organic solvent and a curing agent, if necessary. Another preferred method employs a mixture similar to that described above but containing a plasticizer lithium salt, about 0.1–60% inorganic filler and about 0.1–80% glassy conductor or ceramic lithium conductor, together with an anhydrous organic solvent. The electrolyte is formed by casting the mixture into a sheet film and then evaporating the organic solvent. A curing step is included if the polymer or polymer blend requires curing. In this way a final electrolyte film thickness of less than 1 micron may be formed. Certain methods of making a solid polymer electrolyte are similar to that described above but substitute spraying, or atomizing, of the mixture instead of solvent casting to form the electrolyte on a substrate. The final electrolyte film thickness may be about 0.2 to 3 microns.

A preferred embodiment of the invention provides a method of making a solid polymer electrolyte for a lithium polymer electrolyte battery. This method includes mixing about 30 to 95% (by weight of solid polymer electrolyte) of the base polymer material described above, about 1 to 25% (by weight of solid polymer electrolyte) plasticizer lithium salt, about 0.1–60% (by volume of solid polymer electrolyte) of an inorganic filler having an average particle size less than 0.05 micron in diameter and a surface area of at least about 100 m$^2$/g, and about 0.1–80% (by volume of solid polymer electrolyte) lithium ion conducting material chosen from the group consisting of glassy conductors and ceramic lithium ion conductors, to form a polymer/salt/inorganic filler/ion conductor mixture. The mixture is then cast or extruded to yield a solid polymer electrolyte in the form of a film having a conductivity greater than 1×10$^{-4}$ S/cm at 25° C. or below. In some embodiments of this method the temperature of the mixture is maintained at the melting point of the base polymer material, and in some embodiments the inorganic filler is fumed silica or alumina. In a preferred embodiment of this method a similar mixture is prepared using an ion conductor having an average particle size less than or equal to 0.01 micron in diameter.

In certain embodiments of the methods, very thin film forms of the polymer electrolytes are made at high speed using an automated technique comprising extrusion of the polymer electrolyte. One advantage of this type of method is its low cost compared to conventional polymer electrolyte manufacturing methods. An automated resin melt-cast process for manufacturing a thin film solid polymer electrolyte includes preparing a polymer/salt/inorganic filler/ionic conductor mixture as described above, and while maintaining the temperature of the mixture at the melting temperature of the base polymer material, the mixture is mechanically extruded onto a chilling wheel to yield a melt-cast film. By mechanically pulling the melt-cast film at predetermined speed, tension and heating conditions, the cast film is stretched to a final film thickness of about 4 microns or less to produce a sheet film solid polymer electrolyte having a conductivity of at least $10^{-4}$ to $10^{-3}$ S/cm at 25° C. when combined with a plasticizer lithium salt.

In an alternative embodiment of the automated manufacturing methods, a polymer/salt/filler/ionic conductor mixture prepared as described above is sprayed onto a mechanically operated high speed moving substrate and the solvent is then evaporated. The polymer electrolyte is then cured, if necessary, depending on the particular polymer that is selected.

Still further provided by the present invention is an improved process for making a thin lithium polymer electrolyte rechargeable battery having an anode, a cathode and a polymer electrolyte. A preferred improvement comprises substituting for a conventional anode and current collectors an ultra thin film metallized polymer substrate having a thickness of about 0.5 to 50 microns and a lithium metal layer about 0.1–100 microns thick overlying a metallized layer of the metallized polymer substrate. This improvement also includes substituting for a conventional cathode and current collectors an ultra thin film metallized polymer substrate having a thickness of about 0.5 to 50 microns and an active cathode material layer about 0.1–100 microns thick overlying the metallized layer of a metallized polymer substrate. A further aspect of the improvement includes substituting one of the thin film solid polymer electrolytes described above for the conventional polymer electrolyte. In the preferred versions the metal layers of the anode and cathode metallized polymer substrates are up to 1 micron thick, more preferably about 0.01 micron thick.

Also provided by the present invention is a thin electrode for a lithium polymer electrolyte battery. In certain preferred embodiments an ultra-thin film metal substrate is employed for the cathode substrate or the anode substrate, or for both. The preferred thickness of the ultra-thin film metal substrate is about 1 to 10 microns. A layer of active electrode material overlies one side of the metal substrate and a layer of solid polymer electrolyte overlies the active material. In other embodiments the electrode substrate is a metallized polymer substrate about 1–10$\mu$ thick and comprising a polymer layer and a metallization layer having a resistance of about 0.01–1.0 ohm per square. The metallization layer adheres to one side of the polymer layer. Preferably the metallized polymer substrate includes a non-metallized margin, which may be about 1 to 3 mm, extending from an edge of the polymer layer to an edge of the metallization layer. Certain of these substrates also have a second metallization layer adhered to the other or opposite side of the polymer layer. The second metallization layer also extends about 1 to 3 mm from the same edge of the polymer layer to an edge of the second metallization layer. A layer of another electrode material may overlie the second metallization layer.

Further provided by the present invention is a solid state laminar electrochemical cell comprising an anode layer; a cathode layer; a layer of a solid polymer electrolyte, as described above, disposed between the anode and cathode layers. A current collector is attached to each anode and cathode, respectively. In certain preferred embodiments the current collectors are a very thin material such as a 5$\mu$ or less thick metallic element, or a 0.5 to 50$\mu$ thick metallized plastic.

The present invention also provides an orientation tolerant polymer electrolyte battery that has an all-solid-state composition. Orientation tolerant means that the operation of the battery is unaffected by its position. By contrast, a conventional liquid solvent polymer battery standing upright will tend to have the liquid solvents travel to the bottom of the cell, and during charge and discharge the current along the cell height will vary because of the difference in the conductivity at the bottom of the electrode and at the top. Such orientation sensitive cells typically do not to have very high cycle life and lose capacity as a result of poor charging and discharging. The orientation tolerant polymer electrolyte batteries of the present invention do not suffer from such drawbacks, as they include an all-solid-state electrochemical cell as described above.

A thin film lithium polymer electrolyte battery is also provided by the present invention. Certain embodiments of this battery comprise a resilient flexible hybrid polymeric electrolyte thin film that includes a homogeneous blend of at least two polymers with inorganic filler dispersed therein, impregnated with a lithium ion conducting glass finely dispersed therein and lithium salt; and a pair of spaced-apart flexible thin film electrodes, each including a polymer substrate having an adherent electrically conductive layer thereon, the hybrid film being tightly disposed, or sandwiched, between the pair of thin film electrodes. The polymer substrate of each of the anode and cathode is preferably selected from a group of polymers including PET, PP, PPS, PEN, PVDF and PE, and each polymer substrate is preferably a metallized polymer substrate with a thin metal layer as the adherent conductive layer. The metallized polymer substrate may be about 0.5 to 50 microns thick, thereby rendering it very flexible for ease of coating and handling, to avoid kinking and deformation of the substrate during manufacture of lithium polymer electrolyte batteries. Preferably there is a low resistance metallization layer having a conductivity in a range from about 0.01–1 ohm per square overlying and adhered to a side of the polymer material. Preferably, the layer of polymer material has a non-metallized margin with a width in the range from about one mm to about three mm extending from an edge of the substrate to an edge of the metallization layer. Also preferably a low resistance metallization layer having a conductivity in the aforementioned range overlies and adheres to each respective side of the polymer material, and both sides of the layer of polymer material have such a non-metallized margin present at the same edge of the layer of polymer material.

Still further provided by the present invention is an improved polymer electrolyte battery which contains at least one polymer electrolyte layer. The improvement includes substitution of one of the above-described solid state polymer electrolytes for the conventional polymer electrolyte layers of the battery. By employing the new solid state polymer electrolytes in a polymer electrolyte battery instead of a conventional polymer electrolyte, a cell resistance comparable (i.e., less than or equal) to that of a liquid electrolyte battery is obtained.

Such an improvement is particularly advantageous for providing an improved rechargeable lithium polymer electrolyte battery. A solid state lithium polymer electrolyte, as described above, characterized by its overcharge resistance, may be substituted for a standard lithium polymer electrolyte, which typically includes an organic liquid. Further improvement is obtained by substitution of ultra-thin current collectors for the conventional current collectors. Preferably the improved current collectors are chosen from the group consisting of metallic elements $\leq 5\mu$ thick and metallized plastics 0.5 to $25\mu$ thick. Such improved lithium polymer electrolyte batteries offer many advantages over conventional lithium secondary batteries, including improved energy density, power density, higher capacity utilization, higher cycle life, greater charge-discharge efficiencies, lower polarization, lower self-discharge, wider operating temperature range, and greater safety and reliability. The improved lithium rechargeable batteries can be produced at high speed, lower cost and with improved flexibility and conformability.

According to yet another aspect of the invention, an improved method of fabricating a thin lithium polymer electrolyte rechargeable battery includes incorporating an ultra thin metallized polymer substrate in the battery during fabrication in place of a conventional electrode substrate. The polymer layer of the new thinner substrate has a thickness in a range from about 0.5 micron to about 50 microns. The thickness of the metallization layer on the polymer layer is selected according to the desired conductivity, and is preferably less than about 0.01 micron. The method also includes substituting very thin film battery electrode/electrolyte structures, each 5 microns or less in thickness, in place of their conventional battery counterparts. The improved battery also substitutes a new solid polymer electrolyte, in accordance with one aspect of the invention, for a conventional polymer electrolyte.

These and other embodiments, objects, features and advantages of the present invention will become apparent with reference to the following description and drawings.

BRIEF DESCRIPTION OF THE SEVERAL VIEWS OF THE DRAWING

For a detailed description of a preferred embodiment of the invention, reference will now be made to the accompanying drawings wherein.

DETAILED DESCRIPTION OF THE PREFERRED EMBODIMENTS

Figure 1A:
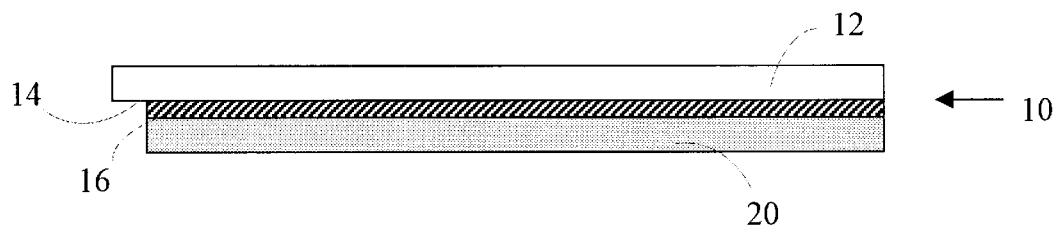
FIG. 1A shows a metallized plain polymer film with an unmetallized margin and a coating of active cathode material not on the margin.

Preferred solid polymer electrolyte compositions are prepared by combining an electrically conductive polymer or polymer blend, a metal salt, a finely divided ionic conductor, and a finely divided inorganic filler material, as exemplified and described in more detail below. Most of these solid polymer electrolytes have conductivities of at least $10^{-4}$ to $10^{-3}$ S/cm at room temperature. Preferably the polymer electrolytes are cationic conductors, most preferably lithium, and are constructed or formed in very thin film format.

Solid Polymer Electrolyte for an Electrochemical Cell

Base Polymer Material

A preferred base polymer material for making a room temperature highly conductive solid polymer electrolyte contains a hybrid copolymer solid-solution homogeneous blend of at least two polymers, one selected from a group having pronounced ionic conductivity, and the other selected from a second group consisting of polymers which are non-ionically conductive. The second polymer serves to provide the basic backbone or strength of the final polymer electrolyte when manufactured in ultra-thin films. However, if the polymer material selected from the first group provides sufficient strength to the polymer electrolyte, one need not include a polymer from the second group in the composition of the base polymer material. Likewise, if a polymer selected from the second group, in addition to meeting the requisite film strength requirement also provides the desired ionic conductivity to the polymer electrolyte, a different polymer from the first group need not be included in the base polymer.

First Polymer Group—Ionically Conductive Polymers

The first group of polymers for a base polymer material are ionically conductive polymers that, when mixed with a metal salt, preferably a lithium salt, have an initial conductivity of at least about $5 \times 10^{-5}$ S/cm at 25° C. Preferably the ionically conductive polymer has a hetero atom with a lone pair of electrons available for the metal ions of the metal salt to attach to and move between during conduction in the final composite. It is preferred that the polymer is chosen from a wide range of solid polymeric materials, including those based on linear polymers such as poly(ethylene oxide) or PEO; random copolymers such as oxymethylene linked PEO; block copolymers such as PEO-PPO-PEO crosslinked with trifunctional urethane; comb-branched block copolymers such as poly(bis(methoxy-ethoxy-ethoxide))-phosphazene or MEEP; network structures such as triol-type PEO crosslinked with difunctional urethane; single ion conductors such as poly((oligo)oxyethylene)methacrylate-co-alkali metal methacrylate, polyacrylonitrile (PAN), polymethylmethacrylate (PMMA); polymethylacrylonitrile (PMAN); polysiloxanes and their copolymers and derivatives; polyvinylidene fluoride or chloride and copolymers of their derivatives; poly(chlorotrifluoro-ethylene); poly(ethylene-chlorotrifluoroethylene); poly-(fluorinated ethylene-propylene); polymers based on a wide variety of acrylates available in the industry; or any other solvent-free polymers or combination of the above polymers either condensed or crosslinked to form a different polymer or mixed physically, which are combinable with a metal salt, such as a lithium salt, to enhance the polymer's ionic conductivity. Even a modestly conductive polymer such as PEO works very well in the electrolyte composition of the present invention, and polymers such as acrylates or MEEP, which possess higher ionic conductivities with a lithium salt should perform at least as well as PEO in the electrolyte compositions of the present invention.

Base polymer/Metal Salt Intermediate Material

A suitable base polymer material is complexed with a metal salt. Metal salts which may be combined with the base polymer material include suitable salts of sodium, lithium, potassium, calcium or magnesium, more preferably lithium. Preferably a plasticizer salt of a metal, e.g. lithium bis (trifluoromethane sulfonyl)imide ($LiN(CF_3SO_2)_2$) or lithium methide ($LiC(SO_2CF_3)_3$), or conventional salts such as lithium hexafluorophosphate ($LiPF_6$), lithium perchlorate ($LiClO_4$), lithium tetrafluoroborate ($LIBF_4$), lithium hexafluoroarsenate ($LiAsF_6$), lithium tetrachloroaluminate ($LiAlCl_4$), and lithium trifluoromethanesulfonate ($LiCF_3SO_3$) is used. A particular salt is selected so that, when added to a polymer such as MEEP, the base polymer/ salt mixture yields a conductivity of at least about $5 \times 10^{-5}$ S/cm at 25° C. Polymers based on various acrylate compositions and lithium imide also yield similar conductivity values, and other polymer/salt compositions chosen from the above-named options have demonstrated conductivity values half an order of magnitude or more higher than MEEP/ lithium imide.

Second Polymer Group—Mechanically Strong/Non-Ionically Conductive Polymers

The second group of polymers for use in a base polymer material or composition includes more inert and high strength materials such as polyester (PET), polypropylene (PP), polyethylene napthalate (PEN), polyvinylidene fluoride (PVDF), polycarbonate (PC), polyphenylene sulfide (PPS) and polytetrafluoroethylene (PTFE). Other polymer materials that possess similar characteristics to these polymers could also be used.

In a two-polymer blend, the concentration of one of the polymers from either the first or second group is in the range from 1% to 99% by weight, the remainder of the blend being the other polymer. The specific polymers chosen from these two groups, and their concentrations in the blend, are selected so as to tailor at least one desired property of the base polymer material. In any case, the chosen polymers provide a base polymer material with high temperature stability, up to at least 150° C. Most of the materials described above, including PVDF, acrylates, PEO, PPO, and the like, possess such thermodynamic or high temperature stability.

Base Polymer Preparation

One or more suitable polymers are selected from the many available polymers to provide the ionically conductive polymer or polymer blend which serves as the base polymer for making the polymer electrolyte. Suitable polymers and polymer blends are identified by preparing a base polymer/ metal salt intermediate and forming it into a solid film by casting or extruding the mixture onto an inert substrate. The conductivity of the intermediate film is then measured. Only polymers or polymer blends which yield a base polymer/ metal salt intermediate with a conductivity $\geq 1 \times 10^{-5}$ S/cm at room temperature are preferred for making the improved solid polymer electrolytes. More preferably, the conductivity of such a base polymer intermediate is in the range of at least about $5 \times 10^{-5}$ S/cm.

Depending upon the particular requirements placed on the polymer electrolyte for the contemplated use, compromises or trade-offs may be made between the conductivity and mechanical strength properties in selecting the particular metal salt and polymer or polymer blend to include in the initial polymer/salt mixture. A specific polymer from among the two groups, and its concentration in the base polymer material, are selected so as to favor at least one desired property of the base polymer material. To obtain an initial polymer-salt mixture having a large enough initial conductivity, a plasticizer salt is preferred for combining with polymer materials such as PEO, which tend to yield poor ionic conductivity with traditional salts such as lithium trifluoromethane sulfonate. Likewise, a polymer material such as MEEP, which already possesses good ionic conductivity, can be combined with a traditional metal salt to provide a mixture with satisfactory conductivity. Subsequent increases in the ionic conductivity and mechanical property are then tailored according to the intended use of the composite by adding to the initial mixture inorganic fillers and highly conductive glasses, or any other conductive fillers that are capable of providing similar enhancement of the ionic conductivity. The conductivity of the intermediate electrolyte compositions are readily determined as described above. The polymer materials are also preferably selected to provide high temperature stability up to at least 150° C. Most of the polymers described above, including PVDF, acrylates, PEO, PPO, and the like possess such high temperature stability.

To prepare a polymer/lithium salt intermediate, one or more of the group 1 and/or group 2 polymers are blended with a lithium salt in a suitable solvent, preferably anhydrous, and the polymer solution cast on an inert substrate and the solvent allowed to evaporate completely. The polymer may be radiation ionizable, i.e. it can be cured through applying ultraviolet or electron beam radiation or it can be cured simply upon drying. Alternatively, the polymer constituents can be blended with the lithium salt at high temperature (i.e., the polymer melting temperature) and cast as a hot-melt resin, or hot-pressed in ultra-thin film to form the base polymer material to a desired final thickness, preferably in a range from 0.5 to 25 microns. In any case, the minimum preferred conductivity required from such a base polymer material, when combined with the lithium salt, is in the range of at least about $5 \times 10^{-5}$ S/cm.

Base Polymer/Metal Salt/Filler Intermediate

The inventor found that by dispersing about 0.1 to 60% (by volume of the final solid composition) fumed silica or very high surface area alumina into a base polymer/metal salt intermediate composition, the ionic conductivity of the resulting mixture increases by about one-half to one order of magnitude above that of the polymer/salt complex alone. It was also observed that the mechanical strength of the final composition was enhanced by including a high surface area filler. For example, addition of 15% high surface area alumina as filler was found to improve the conductivity of the polymer electrolyte from about $5 \times 10^{-5}$ S/cm to $7 \times 10^{-5}$ S/cm at 25° C. One source for a suitable high surface area alumina is Degussa Corporation.

A suitable inorganic filler material is one that enhances the ionic conductivity in a similar manner to the addition of high surface area alumina to lithium iodide, as described by Liang, (id). Preferably, the inorganic filler is fumed silica, a high pure silica in an amorphous crystalline structure, which has a fine particle size and a very high specific surface area similar to alumina. The fine particle size is preferred not only to maintain the high specific surface area but also to ensure that the silica is homogeneously dispersed in the polymer electrolyte. A desirable mean particle size is 0.05 micron or less, preferably 0.01 micron or less. The surface area is 100 $m^2/g$ or more, preferably 200 $m^2/g$. Examples of some suitable fine particle silicas are: AEROSIL 380™, available from Nippon Aerosil; CAB-O-SIL™ GARDE EH-5™ from Cabot Corporation; and SNOWTEX-O™ (a dispersion of silica in water or alcohol) available from Nissan Chemical Industries Ltd. If a water based dispersion is used, the water must be removed completely before assembling the solid polymer electrolyte into a battery. The base polymer material with the metal salt and inorganic filler may be cast or extruded using a hot-melt resin process. Alternatively, dispersion of the inorganic filler into the polymer blend may also be accomplished during polymer and salt dissolution into a solvent, or during extrusion of the polymer. For some uses, the preferred filler content is 0.1–20% fumed silica or alumina having an average particle size less than or equal to 0.01 micron. In the most desirable compositions, the filler enhances the ionic conductivity of the polymer materials by at least one order of magnitude, increasing from about $10^{-5}$ S/cm to about $10^{-4}$ S/cm at room temperature.

Base Polymer/Metal Salt/Filler/Ionic Conductor Electrolyte Composition

While improving the conductivity of the polymer electrolyte from about $5 \times 10^{-5}$ S/cm to $7 \times 10^{-5}$ S/cm by including high surface area inorganic filler is not preferred for electrochemical cells intended to be operated at room temperature, the inventor found that by adding another ionic conductor of significantly higher ion conductivity value than that of the above-described polymer/salt/filler intermediate electrolyte, the ionic conductivity is appreciably increased. The amount of increase in conductivity depends on the conductivity value of this added ionic conductor. Surprisingly, the preferred ionic conductors are very finely ground and dispersed lithium ion conducting sulfide glasses having an initial ionic conductivity of about $2 \times 10^{-3}$ S/cm. Lithium ion ceramic ionic conductors such as lithium beta alumina or a silicate or some other ionically conducting material of high lithium ion mobility could also be used in place of the glass with satisfactory results. The quantity of ionic conductor in the final composition can vary from about 0.1 to 80% (by volume of the final composition) depending on the nature of the ionic conductor material. For example, since these sulfide glasses are extremely hygroscopic, the mixing operation must be done in a low humidity chamber and the material dispersed in a water-free solvent. Adding 40% by volume of the sulfide glass $LiI$—$Li_2S$—$B_2S_3$ to the polymer-salt-alumina complex not only increases the ionic conductivity of the polymer electrolyte to $4 \times 10^{-4}$ S/cm but also provides a final product with excellent mechanical property. For example, the polymer electrolyte is dimensionally stable (i.e., does not stretch), is significantly stronger, still maintains good flexibility, and more readily handled in ultra thin films (less than 5 microns thick) compared to known polymer electrolytes. Although exemplary polymer electrolytes of the present invention were prepared using sulfide glasses with good conductivity characteristics, satisfactory conductivity-enhancing ionic conductor materials are not necessarily limited to glasses. Ceramic ion conductors such as lithium beta alumina, or silicates, or phosphate glass such as lithium phosphorus oxynitride ($Li_3PO_4$), or other similar materials can easily be substituted for the glass and would be expected by the inventor to work about the same as glass. In any case, the mean particle size of the glassy material must be very fine, i.e., 0.1 microns or less. One way to prepare the commercially available glassy materials for addition to the polymer mix is by grinding extensively until the required mean particle size is reached. Grinding is best accomplished in a non-aqueous anhydrous solvent such as isopropanol or ethanol and using zirconia grinding media. The glassy powder can be dried in dry air or under a stream of argon before being used in the polymer electrolyte formulation, in order to eliminate water from the mixture.

A base polymer material with the plasticizer lithium salt, inorganic filler and glassy or ceramic lithium ion conductor when cast as a sheet film material and the solvent allowed to evaporate constitutes a good solid polymer electrolyte for a lithium polymer electrolyte battery. This polymer electrolyte provides a very high room temperature ionic conductivity as well as excellent mechanical strength which is further reinforced by the addition of the glassy constituent. In some solid polymer electrolyte compositions the addition of the sulfide glass enhances the ionic conductivity of the final polymer electrolyte to at least $10^{-3}$ to $10^{-4}$ S/cm. The base polymer blend and the inorganic filler/glassy constituents are tailored to provide the desired ionic conductivity, the desired mechanical strength and desired flexibility for ease of handling and battery fabrication. The lithium ion conducting inorganic materials are chosen so that they are thermodynamically stable when lithium metal is employed as the anode in a lithium battery.

Alternately, the base polymer material with the salt, inorganic filler, and glassy or ceramic lithium ion conductor may be intimately mixed together, and the mixture may be cast or extruded using a hot-melt resin process. Dispersion of the inorganic filler and glassy or ceramic ion conductor into the polymer blend is performed during polymer and salt dissolution into the solvent or during extrusion of the polymer. Adjusting the polymer electrolyte composition to about 0.1–20% (by volume of the final composition) fumed silica or alumina having an average particle size less than or equal to 0.01 micron, and adjusting the ionic conductor content to about 0.1–20% glassy or ceramic lithium ion conductor of average particle size less than or equal to 0.01 micron provides a solid polymer electrolyte with especially good conductivity and flexibility characteristics.

Increasing the amount of sulfide glass to 60% (by volume) serves to further increase the conductivity, to about $6.5 \times 10^{-4}$ S/cm, however the resulting polymer electrolyte is less flexible than that prepared with 40% glass. This composition is satisfactory for use in some small flat cells in which the current delivery from the battery is more important than having a conformal flexible shape battery. Although the conductivity values measured for this composition are not as high as those of liquid-containing metal ion cells, the fact that these new polymer electrolytes are dry and solvent-free, are free from any tackiness and possess excellent mechanical properties makes this new electrolyte distinctly advantageous.

The inventor's discovery that the incorporation of finely divided, or powdered, ionic conductor into the lithium polymer electrolyte composition markedly enhances conductivity goes against conventional battery making technology because the conductivity of a powdered glassy material is usually lower than that of the bulk solid glassy material due to the additional inter-granular resistance of the material. Finely divided glassy material would not be expected to improve the conductivity of a relatively low-conducting polymer. The new electrolytes disclosed herein make possible for the first time the design of very thin film batteries using thinner polymer electrolyte membranes or layers, and to obtain cell resistances comparable to those of liquid electrolyte batteries. In addition, these strong, thin electrolyte membranes permit for the first time the mass manufacture of an all-solid-state battery using high speed winding techniques, as discussed in more detail below.

The following examples are provided to illustrate certain preferred compositions and methods of the invention, but are not meant to be limiting as to the scope of the claimed invention.

EXAMPLE 1

A base polymer material with the lithium salt is dissolved in a suitable liquid organic solvent (anhydrous) to form a polymer solution. A very high surface area inorganic filler—either fumed silica or alumina having an average particle size less than 0.05 micron and a surface area of at least about 100 m$^2$/g—is then extensively dispersed with a concentration in a range from about 0.1–60% by volume of the final solid polymer composition to enhance the mechanical stability and ionic conductivity of the thin film into which the polymer material with inorganic filler is cast. Further to this polymer solution is added a finely dispersed ion conducting material having an average particle size less than 0.1 micron and initial ionic conductivity of at least 2×10$^{-3}$ S/cm at room temperature. The ion conducting material is a lithium ion conductor and makes up about 0.1–80% by volume of the final composition or composite, and more preferably is in the range of 0.1∝20%. The lithium ion conductor is preferably a lithium ion conducting sulfide glass or a ceramic lithium ion conductor such as lithium beta alumina or a silicate, or some other ionically conducting material of high lithium ion mobility. Care is taken to blend these constituents in an inert atmosphere since the sulfide glasses are extremely hygroscopic and may effect the performance of the final lithium batteries. This base polymer material with the plasticizer lithium salt, inorganic filler and glassy or ceramic lithium ion conductor when cast as a sheet film material and the solvent allowed to evaporate constitute the polymer electrolyte for a lithium polymer electrolyte battery. The polymer electrolyte of this composition provides a very high room temperature ionic conductivity as well as excellent mechanical strength. Alternately, the base polymer material with the salt, inorganic filler, and glassy or ceramic lithium ion conductor may be intimately mixed with one another and may be cast or extruded using a hot-melt resin process. Dispersion of the inorganic filler and glassy or ceramic ion conductor into the polymer blend is performed during polymer and salt dissolution into the solvent or during extrusion of the polymer. In some embodiments, the filler is preferably 0.1–20% fumed silica or alumina having an average particle size less than or equal to 0.01 micron and the glassy or ceramic lithium ion conductor is also preferably 0.1–20% by volume having an average particle size less than or equal to 0.01 micron.

EXAMPLE 2

2 g of LiClO$_4$ salt was mixed with 4 g of PEO (MW 3×10$^5$) and 4 g of PEG (MW 5×10$^6$) in a less than 1% relative humidity dry room. The polymer/salt mixture was cast on an aluminum plate. The material was a solid gel and its ionic conductivity measured 5×10$^{-5}$ S/cm. The ionic conductivity of another similarly-prepared polymer/salt mixture measured 7×10$^{-5}$ S/cm. Knowing the base ionic conductivity of the initial polymer/salt mixture, 2 g of high surface area alumina and 5 g of finely powdered LiI—Li$_2$S—B$_2$S$_3$ glass was added to the polymer/salt solution, and the final mixture was cast on an aluminum plate. The conductivity of the final material measured 4×10$^{-4}$ S/cm.

EXAMPLE 3

2 g of lithium imide salt was mixed with a range of acrylate monomers and oligomers, including 2.1 g of isobornyl acrylate, 0.3 g of 1,6-hexanediol diacrylate, 0.8 g trimethylolpropane triacrylate, 8 g ebecryl 230 and 4 g PEO, and 0.014 g of ITX and 0.14 g of Irgacure 184 photoinitiator, dispersed in 20 volume percent isopropanol. A sample portion of this mixture was cast in a thin sheet, the IPA evaporated completely and cured using a 1000 Watts UV light. The conductivity of the cast film was measured to be 4×10$^{-5}$ S/cm. The cast intermediate was very flexible and plastic-like. Next, 2.6 g of very high surface alumina and 8 g of finely dispersed LiI—Li$_2$S—B$_2$S$_3$ glass was added to the polymer/salt solution and the mixture was then cast on an aluminum plate. The solvent was completely evaporated and the polymer mixture cured using UV light. The conductivity of the final polymer electrolyte measured 6.5×10$^{-4}$ S/cm.

EXAMPLE 4

15 mls of trimethylolpropane trimethylacrylate, 5 mls tripropylene glycol diacrylate, and 15 mls of ebecryl 230 was mixed with 3 g of lithium imide, 0.5 g Irgacure 184, 3 g of fumed silica and 5 g of the above sulfide glass. The mixture was cast between glass plates to obtain a very thin sheet and cured using UV light. The conductivity of the thin polymer sheet measured 3×10$^{-4}$ S/cm.

EXAMPLE 5

5 g of lithium imide was mixed with 3 g of IBOA, 10 g of Ebecryl 230, 2.5 g finely divided alumina, 6 g of the sulfide glass, in 40 mls of acetonitrile. The polymer composite solution was cast on a glass plate, the acetonitrile evaporated and the polymer thin layer cured using UV light. The conductivity of the final polymer was found to be 4×10$^{-4}$ S/cm.

Polymer/salt/filler/ionic conductor compositions yielding solid polymer electrolytes with favorable dimensional stability and great resiliency, as described above, can be manufactured in ultra-thin film form in thicknesses of 0.7 to 100 microns using conventional techniques and equipment. Such polymer electrolytes are non-tacky, pin-hole free, flexible in nature, high strength, low resistance and demonstrate high ionic conductivity. Polymer electrolytes of the above compositions are tailored to possess these desirable properties by altering the base polymer/inorganic compositions of the polymer electrolyte. For example, polymer electrolytes are made non-tacky and stronger by selecting polymers of higher molecular weights and incorporating appropriate quantities of the inorganic filler material. Flexibility can be enhanced by incorporating higher percentage of the polymeric material along with the plasticizer salt or other materials. The solid polymer electrolyte is made more highly conductive by first selecting a base polymer material with good initial conductivity, when combined with a metal salt, and then adding appropriate amounts of the inorganic filler and lithium ion conducting glass along with the plasticizer salt. The most preferred solid polymer electrolytes are sufficiently flexible and strong to be used in high-speed manufacturing methods.

Extrusion Manufacturing Process

Polymer electrolytes are manufactured in ultra-thin films and in low resistance by any of a number of existing manufacturing processes. The ultra-thin film and pin-hole free polymer electrolyte is preferably produced by an extrusion process whereby the base polymer material mixed intimately with the plasticizer salt, inorganic filler and lithium ion conducting glass is extruded at the melting temperature of the base polymer through a single or twin-screw extruder onto a chilling wheel. The base polymer material is fed either singly or separately into the extruder via hoppers, and blended with the rest of the material homogeneously to form the resin melt-cast film. An extrusion method is preferred over the solvent cast film (described below) because closer thickness tolerances can be achieved. Operating conditions of the extrusion process, including temperature, throughput, die opening and width, etc. may be adjusted until the desired quality melt-cast film is obtained.

The operating conditions will vary for each composition even if the base polymer materials are the same. Typically, these parameters are varied to achieve a melt-cast polymer electrolyte thickness in a range from about 25 to 50 microns, with preference for the thinner end of this range, so as to achieve a final film thickness of about 2 to 4 microns at the end of the processing run, and a width in the range from about 20 to 30 inches. The wide range of variation present in these numbers is because each polymer will stretch and thin differently, and processing at various stages must be adjusted to obtain the most optimum film desired without breaking, wrinkling, or overheating of the film web, for manufacture at the desired rate. Typically, achievement of a good quality film means that the film is clean of dust or specks; has no bubbles, pinholes or other visible inclusions or impurities within the film; is static-free (to preclude attracting dust particles); and is wrinkle-free, to mention its principal physical attributes.

The melt-cast film is then stretched by being pulled along and through several rollers for feeding it under proper tension into the machine direction orientation (MDO) heated chamber where it is stretched so as to exit the chamber with a typical film thickness that is less than 4 microns. The MDO chamber has a series of rollers and tension control system that stretches the film in the direction of film travel to produce a thinner film with a more uniform thickness. The film exits the MDO chamber at a speed, which is faster than that at entry, depending upon the film thickness at the end of the MDO run. For example, a melt-cast film thickness of 25 microns at entry into the MDO chamber, which is stretched therein to a film thickness of 5 microns, will exit the MDO chamber at five times its entry speed. Here again, the process parameters in the MDO chamber are adjusted—to control conditions such as line speed, film tension, stretching ratios, and so forth, for optimum film quality and desired final thickness. These conditions are dependent not simply on the final film thickness, but primarily on the properties of the polymer materials from the two groups of hybrid polymers. The parameters chosen in the first stage of the film processing, i.e. extrusion and melt-cast film production, will affect the parameters chosen in the second stage of the film processing, i.e. the MDO stretching.

Solvent Casting Process

As an alternative to melt-casting or extrusion, polymers from the two groups, such as PAN and PET, are dissolved together with a plasticizer lithium salt in an appropriate solvent, e.g. an alcohol. Into the resulting polymer/salt solution is dispersed very high surface area inorganic filler, e.g. alumina. Also dispersed into the solution is finely grounded lithium ion conducting glass, such as a sulfide glass. The solvent is evaporated completely after the polymer solution is cast or coated in a thin film onto a film-release substrate. If the polymer from one group is radiation curable, e.g. an acrylate, the cast polymer is cured via ultraviolet or electron beam radiation after the solvent is evaporated.

A number of different methods maybe employed to cast or coat the polymer electrolyte from a solvent-based system including but not limited to, knife coaters, doctor blade coaters, wire-wound bar coaters or Mayer rods, air knife (or air doctor) coaters, squeeze roll or kiss coaters, gravure coaters, reverse roll coaters, cast film coaters, and transfer roll coaters. One skilled in the art of casting or coating will immediately appreciate the suitability of a particular coating system for the intended final result. Coaters that apply an excess to the substrate web and remove the surplus coating, leaving a desired amount on the surface of the web are usually knife coaters, doctor blade coaters, bar or rod coaters, air knife coaters, and squeeze roll coaters. Coaters that apply a predetermined amount of coating to the web are reverse roll coaters, gravure coaters, and transfer roll coaters. Any of these methods could be suitable for coating polymer electrolyte film thickness in the range of 2 to 100 microns. One preferred embodiment of this invention is given by example of one type of coating. The invention teaches a method whereby the polymer electrolyte solution with the finely dispersed inorganic constituents is injected directly onto the substrate and subsequently drawn into thin films of various thickness using wire wound rods or Mayer rods of different wire diameters. The different diameter wire controls the wet slurry thickness. This method and the above methods, which to the applicant's knowledge have not been used previously in the battery industry to manufacture electrodes, yields a polymer electrolyte material that is extremely uniform, pin-hole free and thin. Dry film thickness of 2 microns to greater than 100 microns can be controlled using this process.

Spray Coating Process

Polymers from the two groups listed above, e.g. PAN and PET and a plasticizer lithium salt, are dissolved in an appropriate solvent, e.g. an alcohol to form a polymer solution, dispersing very high surface area inorganic filler, e.g. alumina and further dispersing finely grounded lithium ion conducting glass, e.g. a sulfide glass. The coating is made either by spraying atomized aerosol directly onto a high speed moving substrate, evaporating the solvent and if necessary, curing either by drying or radiation (if the material contains radiation curable elements), or by evaporation of the polymer electrolyte solution directly onto the electrode material. It is preferred if the polymer electrolyte can be blended with a liquid radiation curable polymer, which can dissolve and disperse the salt and inorganic materials, respectively, and if the solvent media can be eliminated. Polymer electrolytes manufactured in this manner can result in final film thickness of less than 1 micron and more preferably in thickness of about 0.2 microns.

Hot-Pressing or Hot-Isostatic Pressing Methods

According to yet another embodiment of the invention, the dry polymers from the different groups are intimately mixed with the salt, inorganic filler, and lithium ion glasses and hot-pressed or hot-isostatic pressed to form a polymer electrolyte. The thickness of the desired film is dependent on the amount of material that is hot-pressed. This method can be very high speed and completely automated, as can the above-described manufacturing techniques.

Each of the above-described manufacturing methods has its own advantages and drawbacks, and the user might prefer one method over another for a particular application, or for cost considerations. One benefit of the hot-pressed method is that exact size of polymer electrolytes can be formed for a lithium polymer electrolyte battery, but in relatively smaller flat sheets and for flat lithium polymer electrolyte batteries. The benefit of the extrusion method is that long lengths of very thin film polymer electrolytes can be manufactured which can then be readily used in wound batteries. A disadvantage of the solvent coating method over the other methods is the additional cost of the solvent involved and regulatory compliance that needs to be addressed to evaporate the solvents. A major advantage of the atomization method is that ultra-thin film in thicknesses of less than one micron can be coated directly onto the electrode in a one-step coating method.

Solid-State Electrochemical Cell

Also provided is a solid state laminar electrochemical cell that includes an anode, a cathode, a solid polymer electrolyte, as described above, and current collectors. Any of these polymer electrolyte films described above may be used to form an electrochemical cell, particularly a lithium ion polymer electrolyte or lithium metal polymer electrolyte battery, by tightly sandwiching the film between thin, flexible active anode and active cathode layers. The anode or the negative electrode can comprise of an alkali metal, alkaline earth metal, transition metal, ion-insertion polymers, ion-insertion inorganic electrodes, insertion electrodes based on carbon and tin oxide, among others, while the cathode or positive electrode can comprise of ion-insertion polymers, and ion-insertion inorganic electrodes, to provide batteries having high specific energy (Wh/kg)(gravimetric) and energy density (Wh/l)(Volumetric), high cycle life, low self-discharge, high current drain capability, lower resistance, and wider operating temperature range. The anode is preferably lithium metal since this gives the highest energy density for the anode. The active cathode may be selected from a wide range of oxides, sulfides and selenides, or any other group well known in the prior art, e.g., $LiMn_2O_4$, $Li_xMnO_2$, $Li_xCoO_2$, $Li_xV_2O_5$, $LiV_3O_8$, $Li_xV_2S_5$, $Li_xNbSe_3$, $Li_xNiO_2$, $Li_xNi_yCO_2O_2$, $Li_xNi_yMn_2O_2$, $Li_xCo_yMn_2O_2$, $MnO_2$, $MoS_2$, $MoS_3$, $MoV_2O_8$, $CoO_2$, $V_6O_{13}$, $V_2O_5$, $V_3O_8$, $VO_2$, $VsS_5$, $TiS_2$, $NbSe_3$, $Cr_2O_5$, $Cr_3O_8$, $WO_3$, lithium doped electronically conducting polymers such as polypyrrole, polyaniline, polyacetylene, and so forth.

Improvement of Conventional Lithium Batteries

In order to obtain high energy content per unit weight or volume, it is necessary to utilize electroactive materials of significantly higher energy content than is now used in conventional commercial batteries. The best possibilities lie in batteries that incorporate a lithium anode or an anode with a chemical potential close to that of metallic lithium (e.g. Li alloy, carbon, or tin oxide). The use of very thin inactive substrate materials is also an important step toward achieving the preferred higher energy density batteries. Conventional lithium rechargeable electrolyte batteries are improved appreciably by substituting thinner components, such as the inactive electrode substrates, in place of their thicker counterparts. One way to make thinner electrodes is to replace the conventional lithium anode, which in typically prepared by stamping lithium metal onto a nickel mesh substrate, with a thinner anode. This is accomplished by laminating lithium metal in the form of a very thin film on one, or preferably both sides of a conventional plastic or polymer strip such as polyester, similar to that used in conventional thin film capacitor manufacturing. The use of such metallized plastic substrates in thickness of 0.5–50 microns serves to significantly reduce the space required for inactive components of the cell, thereby increasing the energy density of the battery.

Figure 4:
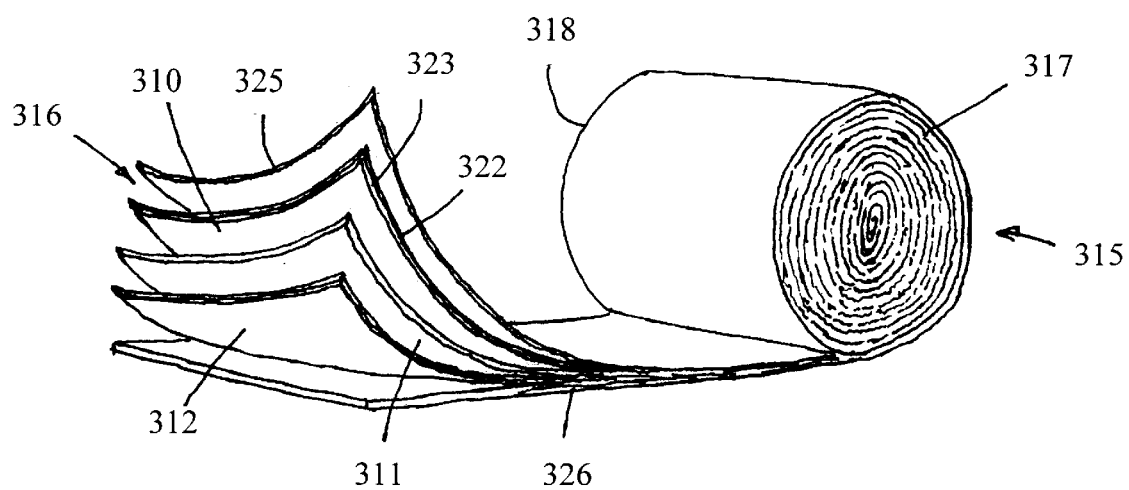
FIG. 4 illustrates a wound electrochemical cell for an ultra-thin battery employing layers similar to those of FIGS. 1A and 1B.

Referring to FIG. 4, three principal webs comprising an anode 310, a hybrid polymer electrolyte film 311 and a cathode 312 of a wound electrochemical cell are shown. The hybrid polymer electrolyte film is preferably prepared from a blend of an ionically conductive first polymer and a more inert, mechanically stronger second polymer, a metal salt, an inorganic filler and an ionically conductive material such as sulfide glass. Preferably the electrolyte and electrode components are chosen as described in the examples above to provide a lithium-based battery. The anode 310, electrolyte 311 and cathode 312 layers are wound as shown to form a thin polymer electrolyte battery 315 anode 310 may be a layer of metallized lithium 322. An insulator sheet 325 and a metallized current collector 326 complete the assembly prior to winding. Alternatively, the layers of the battery may be tightly stacked or laminated instead of wound. A tightly wound construction removes air from between the layers, and allows enhanced and continuous contact between the layers. Care should be exercised to avoid electrical shorting of the beginning of the turns. This can be facilitated by staggering or offsetting the ends of the layers. The tightly wound battery-capacitor hybrid is taped at the edge 316, and may then be strapped in a tray (not shown) which is open on both sides. This provides access to both ends 317 and 318 of the battery 315 for schooping or, preferably, metal spraying thereof, first with a high zinc content solder (harder material) followed by a regular softer "Babbitt" end spray solder (90% tin: 10% zinc). The first end spray scratches the metallized surface and creates a trough to build a better electrical and mechanical contact. By tightly winding the stack and by offsetting the ends of the layers, zinc is prevented from penetrating to the active components. This combination of end sprays also allows better contact adhesion with the final termination.

Subsequently, aluminum leads (not shown) are soldered onto each of the ends 317 and 318 to form the final termination. The battery may then be epoxied to maintain pressure on the cell as well as to protect it further from humidity. This battery-capacitor hybrid 315 is heated to about 80° C. for a period of from 2 to 5 minutes, to improve the interface. If desired, it may be heated under vacuum before epoxying, to improve the interface even further.

A thin film lithium polymer electrolyte battery is formed from a resilient flexible hybrid polymeric electrolyte thin film that includes a homogeneous blend of at least two polymers with inorganic filler dispersed therein, impregnated with a lithium ion conducting glass finely dispersed therein and lithium salt. The battery also includes a pair of spaced-apart flexible thin film electrodes, each including a polymer substrate having an adherent electrically conductive layer thereon, the hybrid film being tightly sandwiched between the pair of thin film electrodes. The polymer substrate of each of the anode and cathode is preferably selected from a group of polymers including PET, PP, PPS, PEN, PVDF and PE, and each polymer substrate is metallized to form the conductive layer thereon. The ultra thin film metallized polymer substrate includes a polymer material selected from a group of polymers including PET, PP, PPS, PEN, PVDF, and PE, and has a thickness in a range from about 0.5 micron to about 50 microns, thereby rendering it very flexible for ease of coating and handling, to avoid kinking and deformation thereof, during manufacture of lithium polymer electrolyte batteries. Each polymer has different characteristic and thermal and mechanical properties and each will behave differently depending upon its use. Preferably the thickness of the metal coating is as thin as possible, but at the same time ensure that the conductivity is very high. Preferably, the thickness of the coating is sufficiently thin to have a resistivity of 0.1 ohms per square or less. More preferably the resistivity is 0.01 ohms per square. This ensures low resistance loss during current drain from the metallized substrate. Preferably, the layer of polymer material has a non-metallized margin with a width in the range from about 1 to 3 mm. Preferably, also, a low resistance metallization layer having a conductivity in the aforementioned range overlies and is adhered to each side of the polymer material, and both sides of the layer of polymer material have such a non-metallized margin present at the same edge of the layer of polymer material.

In an alternative embodiment, a lithium polymer electrolyte battery electrode may comprise an ultra thin film metal substrate for at least one of a cathode substrate and an anode substrate of a lithium polymer electrolyte battery, the ultra thin film metal substrate having a thickness in a range from about one micron to about 10 microns.

By reducing the thickness of the inactive substrate, a regular lithium anode battery is converted into a more compact thin film, flexible battery. However, by eliminating the usual lithium anode and substituting instead a thin sheet of lithium metal deposited by evaporation or sputtering as a very thin film on both sides of a plastic or polymer strip, such as a flexible polyester substrate, similar to that used in conventional thin film capacitor manufacturing, the battery can be even further improved. This strong metallized polymer strip permits winding of the cell components in such a way that no distortion or damage to the lithium electrode occurs. Tabbing the lithium using metal punching through the polymer material allows greater strength than if thin film lithium is to be used alone. If even thinner lithium metal is desired, it is preferable to evaporate it directly onto the polyester. The polymer material provides strength during the tabbing and winding process as well as giving some backbone during the plating and stripping operation.

Figure 1B:
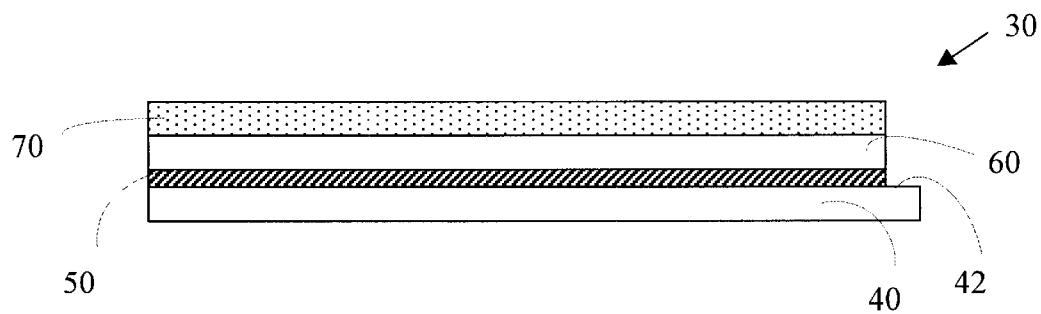
FIG. 1B also shows a metallized plain polymer film with an unmetallized margin and layers of active anode material and solid polymer electrolyte not on the margin.
Figure 2:
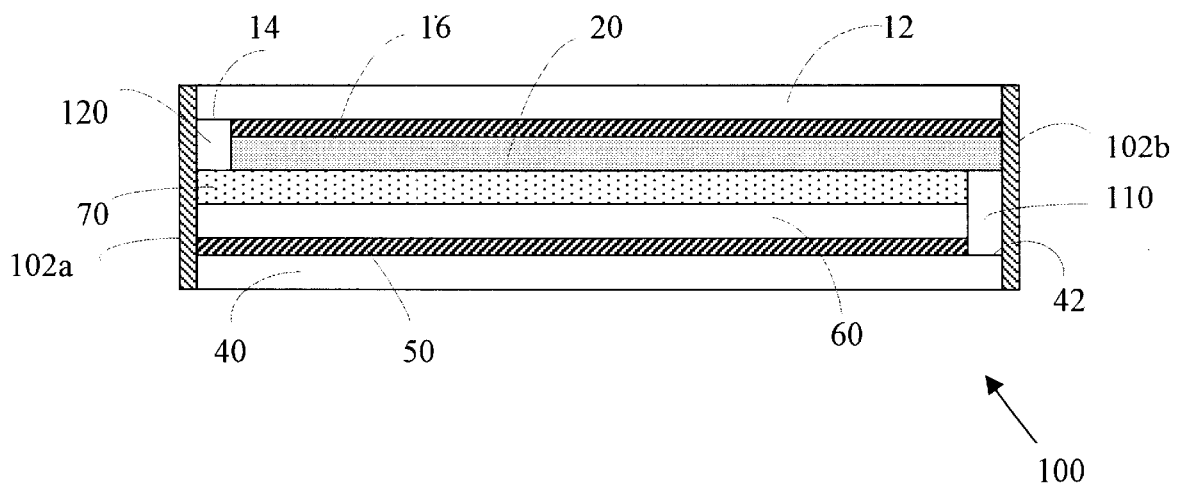
FIG. 2 shows the combined cathode, anode and electrolyte components of FIGS. 1A and 1B and a metallized end spray.

In some cases, it is desirable that the coating of the anode and cathode be carried out in such a way as to leave a margin of uncoated polyester, as illustrated in FIGS. 1–2. Ultra-thin electrodes are illustrated in FIGS. 1A and 1B. In FIG. 1A an anode 10 is shown. Metal layer 16 overlies plain polymer substrate 12, leaving an unmetallized margin 14. Over the metallized layer 16 is a thin coating of anode material 20, preferably lithium metal. FIG. 1B shows a cathode 30. Metal layer 50 overlies plain polymer substrate 40, which may be like polymer substrate 12. An margin 42 of polymer substrate 40 is unmetallized. Over the metal layer 50 is a layer of active cathode material 60. Cathode material 60 does not extend onto the margin. On top of the cathode material 60 is a thin layer of solid polymer electrolyte 70, preferably containing a lithium salt. Electrolyte 70 also is not applied to the margin 42.

FIG. 2 shows the combined cathode assembly 30, anode assembly 10 and polymer electrolyte 70 components of FIGS. 1A and 1B, together with a metalized end spray 102. Void spaces 110, 120 are bounded on two sides by end spray 102 and margins 14, 42, respectively. Because each metalized layer 16 and 50, and the associated active electrode materials 20, 60 do not extend onto the respective margins 14, 42, electrical contact with only one end 102a or 102b is assured. This margin design is especially desirable if the cell is wound like a jelly-roll (as shown in FIG. 4) and if the tabbing or current lead can be placed at the end of the jelly-roll. Such designs are also well suited for bipolar electrode construction thereby increasing the energy further, as illustrated in FIG. 3.

Figure 3:
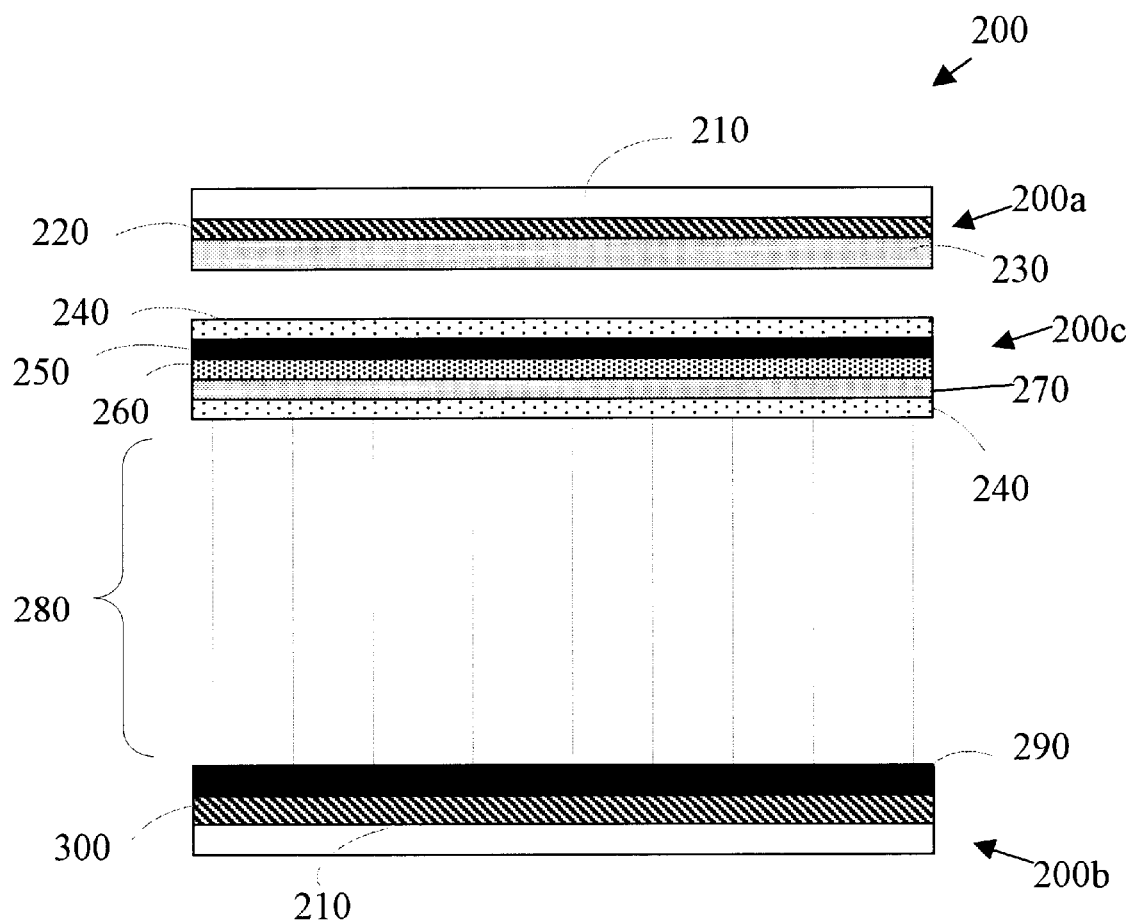
FIG. 3 shows the layers of a thin lithium polymer electrolyte bipolar battery cell.

FIG. 3 is an exploded view of the sequential layers of an exemplary thin lithium polymer electrolyte bipolar battery cell. In this view, the margins of FIGS. 1–2 are not shown. End unit 200a, the anode assembly, includes a plain polymer substrate 210 about 0.5–100 microns thick with a metallized layer 220 which is about 200–500 Å (0.01–0.05$\mu$) thick. Overlying the metallized layer 220 is an ultra-thin lithium anode 230 of about 0.1–100$\mu$ thickness. As shown in FIG. 1A, the metallized layer does not include a margin. On the opposite end of the cell is end unit 200b, the cathode assembly, which also includes a plain polymer substrate 210, metallized layer 300 and cathode layer 290. Disposed tightly between end units 200a and 200b are one or more bipolar units 200c. Preferably a multiplicity of thin bipolar units 200c are sequentially stacked together, the number being limited only by factors related to the intended use. For example, size limitations imposed by spatial constraints of a battery housing.

Bipolar unit 200c includes a central layer of conductive polymer 260 impregnated with carbon or another suitable conductive material. Disposed on either side of a thin conductive polymer substrate 260 are respective 0.1 to 100$\mu$ thick layers of lithium metal anode 270 and an active cathode material 250. The conductive polymer substrate 260 is preferably about 0.5 to 50$\mu$ thick. Coating the anode 270 and the cathode 250 are ultra-thin (i.e., about 0.2 to 100$\mu$ thick) layers of solid polymer electrolyte 240 containing a lithium salt and prepared as previously described. Each bipolar unit 200c is oriented in an operative manner (i.e., favoring electrical flow) such that the cathode layer 250 opposes the anode layer 270 of an adjacent unit. The initial bipolar unit is disposed such that lithium layer 230 of anode end unit 200a opposes cathode layer 250 of bipolar unit 200c. The final bipolar unit 200c in the stack is oriented such that its lithium anode layer 270 opposes cathode layer 296 of end unit 200b.

By using metallized plastic substrates in thickness of 0.5–50 microns, the weight and volume of the inactive components of the cell are reduced significantly, thereby increasing the energy density of the battery even further. In a regular lithium metal anode battery, the ratio of substrate thickness to electrode thickness is typically about 0.8 to 1. Reduction of the ratio of substrate thickness to electrode thickness to less than 0.5, combined with reduced electrolyte thickness and elimination of excess lithium metal and dead space at the top and bottom of the jelly roll, together will provide a substantial improvement in the energy density of the battery. Improved rate capability as a result of the thin film construction, reliability, high cycle life, and improved safety will also result.

A more compact, flexible battery includes very thin film, strong, and yet flexible components similar to film capacitor dielectric material that can be tightly wound similar to a film capacitor. These components include the inactive substrates and the highly conductive polymeric electrolyte and electrode structures described above. Polymeric materials based on network structures such as the acrylates or any other amorphous polymers described above can be optimally selected as the base polymer for making the electrolyte composition, whereby the final polymer electrolyte composite is tailored to be strong, and flexible simply by altering the monomer/oligomer ratios. Likewise, the ionic conductivity of the composite is optimized by selecting an appropriate plasticizer salt and incorporating inorganic filler material and lithium ion conducting glasses. The batteries can be even further improved by coating the thinner, metallized plastic current collectors with very thin layers of active anode or cathode material.

Ultra-thin Lithium Polymer Electrolyte Rechargeable Battery

Combining the thinnest possible inactive components with the new solid polymer electrolytes described above, both sides of an ultra-thin plastic or polymer substrate are laminated with the anode and cathode elements so as to yield an ultra-thin, highly flexible electrode. Polymer electrolytes fabricated in very thin film form are used with thin film anode and cathode electrodes. For example, the polymer layer in the substrate may have a thickness in a range from about 0.5 micron to about 50 microns, in conjunction with very thin film battery electrode/electrolyte structures having thickness less than 5 microns/5 microns, respectively. The thickness of the metallization layer on the polymer layer is selected according to the desired conductivity thereof, the thickness being preferably 0.01 micron, or it maybe up to 1 micron thick. The metallized layer should be thick enough to provide sufficient conductivity, but not so thick that the metallized layer puckers. At the same time, it is also desirable to keep the resistivity of the metallized layer as low as possible (i.e., about 0.01 ohms per square or less.)

By designing an all-solid-state battery based on very thin film active and inactive components, one can effectively increase the surface area of the active plates. As a consequence, the battery will have a higher current drain capability, low resistance, higher energy content, low self-discharge rate, a wide operating temperature range, freedom from dendrite formation, higher efficiency, higher capacity utilization, higher cycle life, and better reliability and safety.

An ultra-thin battery as exemplified by one of the above-described designs, will better tolerate overcharge and will not lead to the emission of any deleterious species or outgassing. This is inherently provided by the fact that the polymer electrolyte is solid state. Since there is no liquid solvents within the solid polymer electrolyte, the inventor has found that overcharge of batteries using solid polymeric electrolytes does not involve any gassing reactions and instead the polymer just degrades to a crystalline deposit. Hence, batteries constructed from such solid polymer electrolytes are safer than their liquid electrolyte counterparts.

It will thus be recognized that polymer electrolytes fabricated in very thin film form can be used with thin film anode and cathode electrodes. By designing a battery based on very thin film active and inactive components, the surface area of the active plates can be effectively increased to provide the battery with higher current drain capability, lower resistance, higher energy content, lower self-discharge, wide operating temperature range, absence of dendrite formation, higher efficiency, higher capacity utilization, greater cycle life, and improved reliability and safety. Such a battery is able to tolerate overcharge, without emission of any deleterious species or outgassing. Furthermore, when designed around very thin metallized polymer films, up to about 1 micron thick, as the substrate material, the energy density may be expected to improve by at least 100% over state-of-the-art lithium ion batteries, with reduced cost. A method of producing cells with the above attributes is to manufacture very thin film cell components, and once the individual cell components have been laminated, the finished cell is heated to about 60–80° C. for about 2 hours. This enhances the electrode/electrolyte interface and allows better interfacial adhesion and improved cyclability.

While the preferred embodiments of the invention have been shown and described, modifications thereof can be made by one skilled in the art without departing from the spirit and teachings of the invention. The embodiments described herein are exemplary only, and are not limiting. For instance, while lithium polymer electrolyte electrochemical cells are emphasized in the foregoing description, the methods, compositions and devices of the invention can be readily extended to any battery and capacitor chemistry, both primary and secondary. For example, compositions and devices based on sodium, potassium, magnesium, calcium, zinc, nickel or tin oxide anode materials, and compatible metal salts would also be satisfactory. Also, the base polymer materials and the polymer electrolytes may be used in electrochromic devices, photoelectrochemical devices, sensors, and other solid state electroconductive devices.

Many variations and modifications of the invention disclosed herein are possible and are within the scope of the invention. Accordingly, the scope of protection is not limited by the description set out above, but is only limited by the claims which follow, that scope including all equivalents of the subject matter of the claims.

What is claimed is:

1. A solid polymer electrolyte having a conductivity greater than $1 \times 10^{-4}$ S/cm at 25° C. or below, absent any solvent, and comprising a mixture of:
    a base polymer material comprising at least one ionically conductive polymer and having an initial conductivity of at least about $1 \times 10^{-5}$ S/cm at 25° C. when combined with a metal salt in the absence of solvent;
    a metal salt;
    an inorganic filler having an average particle size less than 0.05 micron in diameter and a surface area of at least approximately 100 $m^2/g$; and
    an ionic conducting material having an average particle size less than 0.1 micron in diameter and an initial ionic conductivity of at least $2 \times 10^{-3}$ S/cm at 25° C., wherein the solid polymer electrolyte does not contain a solvent.

2. The solid polymer electrolyte of claim 1 wherein said electrolyte is a cationic conductor.

3. The solid polymer electrolyte of claim 1 wherein said metal salt is a salt of an element chosen from the group consisting of sodium, lithium, potassium, magnesium and calcium.

4. The solid polymer electrolyte of claim 1 wherein said metal salt is a lithium salt.

5. The solid polymer electrolyte of claim 3 wherein said lithium salt is chosen from the group consisting of lithium hexafluorophosphate ($LiPF_6$), lithium perchlorate ($LiClO_4$), lithium tetrafluoroborate ($LiBF_4$), lithium hexafluoroarsenate ($LiAsF_6$), lithium tetrachloroaluminate ($LiAlCl_4$), lithium trifluoromethanesulfonate ($LiCF_3SO_3$), lithium methide ($LiC(SO_2CF_3)_3$ and lithium bis(trifluoromethane sulfonyl)imide ($LiN(CF_3SO_2)_2$).

6. The solid polymer electrolyte of claim 3 wherein said lithium salt is a plasticizer salt.

7. The solid polymer electrolyte of claim 1 comprising:
    approximately 30 to 95% (by weight of solid polymer electrolyte) base polymer material;
    approximately 1 to 25% (by weight of solid polymer electrolyte) metal salt;
    approximately 0.1–60% (by volume of solid polymer electrolyte) inorganic filler; and
    approximately 0.1–80% (by volume of solid polymer electrolyte) ionic conducting material.

8. The solid polymer electrolyte of claim 7 wherein the concentration of said inorganic filler is approximately 0.1–20% (by volume of solid polymer electrolyte) and the concentration of said ionic conducting material is approximately 0.1–20% (by volume of solid polymer electrolyte).

9. The solid polymer electrolyte of claim 1 wherein
    said metal salt is a plasticizer lithium salt,
    said inorganic filler is chosen from the group consisting of fumed silica and alumina, and
    said ion conducting material is chosen from the group consisting of glassy lithium ion conductors and ceramic lithium ion conductors.

10. The solid polymer electrolyte of claim 9 wherein said lithium ion conducting material is chosen from the group consisting of sulfide glasses, lithium beta alumina, lithium silicates, lithium phosphorus oxynitride ($Li_3PO_4$), and other phosphate glasses.

11. The solid polymer electrolyte of claim 1 wherein said base polymer material comprises at least two polymers, the first said polymer being an ionically conductive polymer, the monomers of which have a hetero atom with a lone pair of electrons available for the metal ions of a metal salt to attach to and move between during conduction, when said first polymer is mixed with a metal salt.

12. The solid polymer electrolyte of claim 11 wherein said first polymer is chosen from the group consisting of linear polymers, random copolymers, block copolymers, comb-branched block copolymers, network structures, single ion conductors, polyvinylidene fluoride or chloride and copolymers thereof, poly(chlorotrifluoroethylene), poly(ethylene-chlorotrifluoroethylene), and poly(fluorinated ethylene-propylene).

13. The solid polymer electrolyte of claim 11 wherein said first polymer is chosen from the group consisting of polyethylene oxide (PEO), oxymethylene linked PEO, PEO-PPO-PEO crosslinked with trifunctional urethane; poly(bis-methoxy-ethoxy-ethoxide))-phosphazene (MEEP); a trihydroxy linked PEO crosslinked with difunctional urethane, poly((oligo)oxyethylene)methacrylate-co-alkali metal methacrylate; polyacrylonitrile (PAN), polymethylmethacrylate (PMMA), polymethylacrylonitrile (PAN); polysiloxanes and their copolymers, polyvinylidene fluoride or chloride and copolymers thereof, poly(chlorotrifluoroethylene), poly(ethylene-chlorotrifluoroethylene), poly(fluorinated ethylene-propylene), acrylate-based polymer, combinations of the foregoing polymers either condensed or crosslinked to form a different polymer, and physical mixtures of any of the foregoing polymers, provided said first polymer is combinable with a lithium salt such that the ionic conductivity of said first polymer is enhanced.

14. The solid polymer electrolyte of claim 11 wherein the second of said at least two polymers is more inert with respect to ionic conductivity and is mechanically stronger than said first polymer when each said polymer is in the form of a thin film.

15. The solid polymer electrolyte of claim 14 wherein said second polymer is chosen from the group consisting of polyester (PET), polypropylene (PP), polyethylene napthalate (PEN), polyvinylidene fluoride (PVDF), polycarbonate (PC), polyphenylene sulfide (PPS), and polytetrafluoroethylene (PTFE).

16. The solid polymer electrolyte of claim 1 wherein the composition of said base polymer material comprises approximately 1% to 99% (by weight of said base polymer material) of one polymer and the remainder of said base polymer material comprises at least one other polymer.

17. The solid polymer electrolyte of claim 1 wherein said base polymer material is dimensionally stable up to at least 150° C. in said solid polymer electrolyte.

18. The solid polymer electrolyte of claim 1 wherein said at least one of said at least one polymer has a non-linear molecular structure and said solid polymer electrolyte further comprises a resilient, amorphous structure.

19. The solid polymer electrolyte of claim 1 wherein said electrolyte is in the form of a 0.2 to 100 micron thick film.

20. The solid polymer electrolyte of claim 19 wherein said electrolyte is in the form of a 0.2 to 10 micron thick film.

21. The solid polymer electrolyte of claim 20 wherein said electrolyte is in the form of a 0.2 to 3 micron thick film.

22. The solid polymer electrolyte of claim 1 further characterized by a resistance of no more than approximately 1 $\Omega/cm^2$ when employed as a thin-film electrolyte in an electrochemical cell.

23. A chemically stable solid polymer electrolyte for use with a lithium metal anode of a polymer electrolyte battery, said electrolyte comprising:

approximately 30 to 95% (by weight of solid polymer electrolyte) base polymer material comprising at least one ionically conductive polymer and having an initial conductivity of at least approximately $10^{-5}$ S/cm at 25° C. when combined with a lithium salt in the absence of solvent, approximately 1 to 25% (by weight of the solid polymer electrolyte) lithium salt, approximately 0.1–60% (by volume of the solid polymer electrolyte) inorganic filler having an average particle size less than 0.05 micron in diameter and a surface area of at least approximately 100 $m^2/g$, approximately 0.1–80% (by volume of the solid polymer electrolyte) lithium ion conducting material having an average particle size less than 0.1 micron in diameter and an initial ionic conductivity of at least $2\times10^{-3}$ S/cm at 25° C., wherein the solid polymer electrolyte does not contain a solvent.

24. A method of making a solid polymer electrolyte having a conductivity greater than $1\times10^{-4}$ S/cm at 25° C. in the absence of solvent, the method comprising:

mixing together
a base polymer material comprising at least one ionically conductive polymer and having an initial conductivity of at least approximately $1\times10^{-5}$ S/cm at 25" C. when combined with a metal salt in the absence of solvent,
a metal salt,
an inorganic filler having an average particle size less than 0.05 micron in diameter and a surface area of at least approximately 100 $m^2/g$,
an ion conducting material having an average particle size less than 0.1 micron in diameter and an initial ionic conductivity of at least $2\times10^{-3}$ S/cm at 25° C.,
optionally, a liquid organic solvent, and
optionally, a curing agent, to form a mixture;
optionally, maintaining the temperature of said mixture at the melting point of said base polymer material;
forming said mixture into a solid polymer electrolyte;
evaporating said liquid organic solvent, if an organic solvent is present, and
optionally, curing said solid polymer electrolyte, such that a solvent-free solid polymer electrolyte is produced.

25. The method of claim 24 wherein said step of forming said mixture into a solid polymer electrolyte comprises forming a 0.2 to 100 microns thick solid polymer electrolyte film.

26. The method of claim 25 wherein said step of forming said mixture into a solid polymer electrolyte comprises forming a 0.2 to 10 microns thick solid polymer electrolyte film.

27. The method of claim 26 wherein said step of forming said mixture into a solid polymer electrolyte comprises forming a 0.2 to 3 microns thick solid polymer electrolyte film.

28. The method of claim 24 further comprising:
preparing a polymer/salt intermediate composition containing said base polymer material and said metal salt;
forming an aliquot of said intermediate composition into an initial polymer/salt electrolyte; and
determining a conductivity of at least $5\times10^{-5}$ S/cm at 25° C. for said initial polymer/salt electrolyte in the absence of solvent.

29. The method of claim 24 further comprising:
preparing a polymer/salt/filler intermediate containing:
said polymer/salt intermediate composition and an inorganic filler having an average particle size less than 0.5 micron in diameter and a surface area of at least approximately 100 m$^2$/g;
forming an aliquot of said polymer/salt/filler intermediate into a solid; and
determining a conductivity of at least 1×10$^{-4}$ S/cm at 25° C. for said polymer/salt/filler intermediate in the absence of solvent.

30. The method of claim 24 wherein said step of forming said mixture into a solid polymer electrolyte comprises stamping said mixture onto a substrate.

31. The method of claim 24 wherein said mixing step includes adding a liquid organic solvent and said method further comprises evaporating said liquid organic solvent prior to said optional step of curing said solid polymer electrolyte.

32. The method of claim 31 wherein said step of forming said mixture into a solid polymer electrolyte comprises casting said mixture using an apparatus chosen from the group consisting of knife coaters, doctor blade coaters, wire-wound bar coaters, air knife coaters, squeeze roll, gravure coaters, reverse roll coaters, cast film coaters and transfer roll coaters.

33. The method of claim 32 wherein said step of forming said mixture into a solid polymer electrolyte further comprises forming a final solid polymer electrolyte 0.2 to 100 microns thick.

34. The method of claim 24 wherein said mixing step comprises:
mixing together
approximately 30 to 95% (by weight of solid polymer electrolyte) base polymer material comprising at least one ionically conductive polymer and having an initial conductivity of at least approximately 10$^{-5}$ S/cm at 25° C. when combined with a metal salt in the absence of solvent,
approximately 1 to 25% (by weight of the solid polymer electrolyte) metal salt,
approximately 0.1–60% (by volume of the solid polymer electrolyte) inorganic filler having an average particle size less than 0.05 micron in diameter and a surface area of at least approximately 100 m$^2$/g,
approximately 0.1–80% (by volume of the solid polymer electrolyte) ion conducting material having an average particle size less than 0.1 micron in diameter and an initial ionic conductivity of at least 2×10$^{-3}$ S/cm at 25° C.,
optionally, a liquid organic solvent, and
optionally, a curing agent, to form a mixture.

35. The method of claim 34 wherein said mixing step further comprises maintaining the temperature of the mixture at the melting point of said base polymer material and said forming step includes forming said solid polymer electrolyte by a process chosen from the group consisting of hot-melt resin casting, hot-melt resin extrusion, hot-pressing, and hot-isostatic pressing said mixture.

36. The method of claim 35 wherein said forming step comprises hot-melt resin casting said mixture.

37. The method of claim 36 wherein said forming step further comprises achieving a final film thickness of approximately 2 to 4 microns.

38. The method of claim 35 wherein said forming step further comprises achieving a final film width of approximately 20 to 30 inches.

39. The method of claim 34 wherein said forming step comprises hot-melt resin extrusion of said mixture.

40. The method of claim 39 wherein said forming step further comprises achieving a final film thickness of approximately 2 to 25 microns.

41. A polymer electrolyte membrane characterized by a non-tacky consistency and a pin-hole free structure, said membrane containing no liquid organic solvent and prepared by the process of claim 39.

42. The polymer electrolyte membrane of claim 41 wherein said metal salt is a plasticizer salt and said membrane is flexible.

43. The polymer electrolyte membrane of claim 42 were in said membrane is conformable.

44. The method of claim 34 wherein said forming step comprises hot-pressing of said mixture.

45. The method of claim 34 wherein said forming step comprises hot-isostatic pressing of said mixture.

46. The method of claim 34 wherein said step of forming said mixture into a solid polymer electrolyte comprises extruding said mixture, and said mixing step includes blending said inorganic filler with the other said ingredients during extrusion of said mixture.

47. The method of claim 46 wherein said mixing step includes selecting an inorganic filler from the group consisting of fumed silica and alumina.

48. The method of claim 24 wherein said mixing step comprises:
mixing together
approximately 30 to 95% (by weight of solid polymer electrolyte) base polymer material comprising at least one ionically conductive polymer and having an initial conductivity of at least approximately 10$^{-5}$ S/cm at 25° C. when combined with a metal salt in the absence of solvent,
approximately 1 to 25% (by weight of solid polymer electrolyte) metal salt,
approximately 0.1–60% (by volume of solid polymer electrolyte) inorganic filler having an average particle size less than or equal to 0.01 micron in diameter and a surface area of at least approximately 100 m$^2$/g,
approximately 0.1–80% (by volume of solid polymer electrolyte) ionic conducting material having an average particle size loss than 0.1 micron in diameter and an initial ionic conductivity of at least 2×10$^{-3}$ S/cm at 25° C.,
optionally, a liquid organic solvent, and
optionally, a curing agent, to form a mixture.

49. The method of claim 48 wherein said mixing step includes dissolving said base polymer material and said metal salt in an anhydrous organic solvent.

50. The method of claim 48 wherein said step of forming a solid polymer electrolyte comprises casting said mixture on an inert substrate and evaporating said solvent.

51. The method of claim 48 wherein said step of forming said mixture into a solid polymer electrolyte comprises forming a solid polymer electrolyte ranging in thickness from approximately 0.5 to 100 microns.

52. The method of claim 48 comprising curing said solid polymer electrolyte after removing said solvent, if any.

53. The method of claim 52 wherein said curing step comprises applying ultraviolet or electron beam radiation to said solid polymer electrode.

54. The method of claim 24 wherein said mixing step comprises:
mixing together approximately 30 to 95% (by weight of solid polymer electrolyte) base polymer material comprising at least one ionically conductive polymer and having an initial conductivity of at least approximately $10^{-5}$ S/cm at 25° C. when combined with a lithium salt in the absence of solvent, approximately 1 to 25% (by weight of solid polymer electrolyte) of a lithium salt, approximately 0.1–20% (by volume of solid polymer electrolyte) inorganic filler having an average particle size less than or equal to 0.01 micron in diameter and a surface area of at least approximately 100 m$^2$/g, approximately 0.1–80% (by volume of solid polymer electrolyte) lithium ion conducting material chosen from the group consisting of sulfide glass and ceramic lithium ion conductors, and having an average particle size less than 0.1 micron in diameter and an initial ionic conductivity of at least $2\times10^{-3}$ S/cm at 25° C., optionally, a liquid organic solvent, and optionally, a curing agent, to form a mixture.

55. A method of making a solid polymer electrolyte for a lithium polymer electrolyte battery, the method comprising:

mixing together approximately 30 to 95% (by weight of solid polymer electrolyte) base polymer material comprising at least one ionically conductive polymer and having an initial conductivity of at least approximately $1\times10^{-5}$ S/cm at 25° C. when combined with a plasticizer lithium salt in the absence of solvent;

approximately 1 to 25% (by weight of solid polymer electrolyte) plasticizer lithium salt;

approximately 0.1–60% (by volume of solid polymer electrolyte) of an inorganic filler having an average particle size less than 0.05 micron in diameter and a surface area of at least approximately 100 m$^2$/g;

approximately 0.1–80% (by volume of solid polymer electrolyte) an ion conducting material chosen from the group consisting of glassy conductors and ceramic lithium ion conductors; and an anhydrous organic solvent, to form a base polymer/salt/inorganic filler/ionic conductor mixture; and forming said mixture into a solvent free lithium solid polymer electrolyte having a conductivity of at least $10^{-4}$ to $10^{-3}$ S/cm at 25° C. or below in the absence of solvent.

56. The method of claim 55 further comprising casting said mixture into a sheet film; and evaporating said organic solvent to yield a solid polymer electrolyte less than 1 micron thick.

57. The method of claim 55 further comprising spraying said mixture onto a substrate, evaporating said solvent, and curing said polymer electrolyte, if said base polymer material comprises a curable polymer.

58. The method of claim 57 wherein said spraying comprises atomizing said mixture onto a substrate whereby a final polymer electrolyte film approximately 0.2 to 100 micron thick is formed.

59. A method of making a solid polymer electrolyte for a lithium polymer electrolyte battery, the method comprising:

mixing (a) approximately 30 to 95% (by weight of solid polymer electrolyte) base polymer material, having a conductivity of at least approximately $5\times10^{-5}$ S/cm at 25° C. when combined with a metal salt in the absence of solvent, said base polymer material comprising at least two polymers, the first said polymer being an ionically conductive polymer, the monomers of which have a hetero atom with a lone pair of electrons available for the metal ions of a metal salt to attach to and move between during conduction, when said first polymer is mixed with a metal salt, and the second of said at least two polymers being more inert with respect to ionic conductivity when combined with said metal salt and having greater mechanical strength than said first polymer when each said polymer is in the form of a thin film, (b) approximately 1 to 25% (by weight of solid polymer electrolyte) plasticizer lithium salt, (c) approximately 0.1–60% (by volume of solid polymer electrolyte) of an inorganic filler having an average particle size less than 0.05 micron in diameter and a surface area of at least approximately 100 m$^2$/g, and (d) approximately 0.1–80% (by volume of solid polymer electrolyte) ion conducting material chosen from the group consisting of glassy conductors and ceramic lithium ion conductors, to form a base polymer/salt/inorganic filler/ion conductor mixture; and casting or extruding said mixture to yield a solvent-free solid polymer electrolyte in the form of a film having a conductivity greater than $1\times10^{-4}$ S/cm at 25° C. or below in the absence of solvent.

60. The method of claim 59 further comprising maintaining the temperature of said mixture at the melting point of said base polymer material.

61. The method of claim 59 wherein said mixing step is modified by substituting approximately 0.1–20% (by volume of solid-polymer electrolyte) inorganic filler chosen from the group consisting of fumed silica and alumina, having an average particle size less than 0.01 micron in diameter and a surface area of at least approximately 100 m$^2$/g for said approximately 0.1–60% inorganic filler; and substituting approximately 0.1–20% (by volume of solid polymer electrolyte) ion conducting material chosen from the group consisting of glassy conductors and ceramic lithium ion conductors having an average particle size less than or equal to 0.01 micron in diameter, to form a base polymer/salt/inorganic filer/ionic conductor mixture for said 0.1–80% ion conducting material.

62. An automated resin melt-cast process for manufacturing a thin film solid polymer electrolyte comprising:

mixing approximately 30 to 95% (by weight of solid polymer electrolyte) base polymer material comprising at least two polymers, the first said polymer chosen from the group consisting of polyethylene oxide (PEO), oxymethylene linked PEO, PEO-PPO-PEO crosslinked with trifunctional urethane, poly(bis(methoxy-ethoxy-ethoxide))-phosphazene (MEEP, a triol-type PEO crosslinked with difunctional urethane, poly((oligo)oxyethylene)methacrylate-co-alkali metal methacrylate, polyacrylonitrile (PMAN), polymethylmethacrylate (PMMA), polymethylacrylonitrile (PMAN), polysiloxanes and copolymers thereof, polyvinylidene fluoride or chloride and copolymers thereof, poly(chlorotrifluoro-ethylene), poly(ethylene-chlorotrifluoroethylene), poly(fluorinated ethylene-propylene), acrylate-based polymers, and combinations of the foregoing polymers either condensed or crosslinked to form a different polymer, and physical mixtures of any of the foregoing polymers, provided said first polymer is combinable with a lithium salt such that the ionic conductivity of said first polymer is enhanced; and wherein said second polymer is chosen from the group consisting of polyester (PET), polypropylene (PP), polyethylene napthalate (PEN), polyvinylidene fluoride (PVDF), polycarbonate (PC), polyphenylene sulfide (PPS), and polytetrafluoroethylene (PTFE), approximately 1 to 25% (by weight of solid polymer electrolyte) plasticizer lithium salt, approximately 0.1–60% (by volume of solid polymer electrolyte) of an inorganic filler having an average particle size less than 0.05 micron in diameter and a surface area of at least approximately 100 $m^2/g$, and approximately 0.1–80% (by weight of solid polymer electrolyte) ion conducting material chosen from the group consisting of glassy conductors and ceramic lithium ion conductors, to form a base polymer/salt/inorganic filler/ionic conductor mixture;

while maintaining the temperature of said mixture at the melting temperature of said base polymer material, mechanically extruding said mixture onto a chilling wheel to yield a melt-cast film;

mechanically pulling said melt-cast film such that said melt-cast film is stretched to a final film thickness of approximately 4 microns or less to yield a solvent-free sheet film solid polymer electrolyte having a conductivity of at least $10^{-4}$ to $10^{-3}$ S/cm at 25° C. or below when combined with a plasticizer lithium salt in the absence of solvent.

63. An automated spray coating process for manufacturing a thin film solid polymer electrolyte comprising:

the method of claim 59 wherein said step of spraying said mixture onto a substrate is modified by substituting the following step:

spraying said mixture onto a mechanically operated high speed moving substrate, evaporating said solvent, and optionally curing said polymer electrolyte.

64. In a thin lithium polymer electrolyte rechargeable battery including an anode, a cathode and a polymer electrolyte, the improvement comprising:

substituting for said anode an ultra thin film metallized polymer substrate having a thickness of approximately 0.5 to 50 microns and a lithium metal layer approximately 0.1 to 100 microns thick overlying a metallized layer of said metallized polymer substrate;

substituting for said cathode an ultra thin film metallized polymer substrate having a thickness of approximately 0.5 to 50 microns and an active cathode material layer approximately 0.1–100 microns thick overlying a metallized layer of said metallized polymer substrate; and substituting for said polymer electrolyte the thin film solid polymer electrolyte of claim 4.

65. The battery of claim 64 wherein substituting for said anode and said cathode include using metallized polymer substrates having metallization layers up to 1 micron thick.

66. The battery of claim 65 wherein substituting for said anode and said cathode includes using metallized polymer substrates having metallization layers approximately 0.01 micron thick.

67. A thin electrode for a lithium polymer electrolyte battery comprising:

an ultra-thin film metal substrate for at least one electrode substrate of a lithium polymer electrolyte battery, said ultra-thin film metal substrate having a thickness of approximately 1 to 10 microns;

a layer of active electrode material overlying a side of said metal substrate; and a layer of the solid polymer electrolyte according to claim 4 overlying said active electrode material.

68. A thin electrode for a lithium polymer electrolyte battery comprising:

an ultra-thin film metallized polymer substrate for at least one electrode substrate of a lithium polymer electrolyte battery, said ultra-thin film metalized polymer substrate having a thickness of approximately 1 to 10 microns and comprising a polymer layer and a first metallization layer having a conductivity of approximately 0.01–1.0 ohm per square, said first metallization layer adhering to a first side of said polymer layer;

a layer of active electrode material overlying said first metallization layer; and a layer of the solid polymer electrolyte according to claim 4 overlying said active electrode material.

69. The electrode of claim 68 wherein said first side of said polymer layer comprises a first non-metallized margin.

70. The electrode of claim 69 wherein said first non-metallized margin extends approximately 1 to 3 mm from an edge of said first side to a edge of said first metallization layer.

71. The electrode of claim 70 further comprising a second metallization layer adhered to a second side of said polymer layer, said second side of said polymer layer comprising a second non-metallized margin extending approximately 1 to 3 mm from said edge to an edge of said second metallization layer.

72. The electrode of claim 71 further comprising a layer of another active electrode material overlying said second metallized layer.

73. A solid state laminar electrochemical cell comprising:

an anode layer;

a cathode layer;

a layer of solid polymer electrolyte according to claim 1 disposed between said anode and cathode layers;

an anode current collector attached to said anode; and a cathode current collector attached to said cathode.

74. The solid state laminar electrochemical cell of claim 73 wherein each said current collector is a very thin material chosen from the group consisting of metallic elements less than $10\mu$ thick and metallized plastics 0.5 to $50\mu$ thick.

75. An orientation tolerant polymer electrolyte battery having an all-solid-state composition comprising the laminar electrochemical cell of claim 73.

76. A thin film lithium polymer electrolyte battery comprising:

a resilient flexible hybrid polymeric electrolyte thin film having a conductivity of at least approximately $1\times10^{-4}$ S/cm and containing a homogeneous blend of at least two polymers, one of which being an ionically conductive polymer having an initial conductivity of at least approximately $1\times10^{-5}$ S/cm at 25° C. when combined with a lithium salt in the absence of solvent, a lithium salt, an inorganic filler having an average particle size less than 0.05 micron in diameter and a surface area of at least approximately 100 $m^2/g$, and a lithium ion conducting material having an average particle size less than 0.1 micron in diameter and an initial ionic conductivity of at least $2 \times 10^{-3}$ S/cm at 25° C., wherein said polymeric electrolyte thin film does not contain a solvent; and a pair of spaced-apart flexible thin film electrodes, each said electrode comprising a polymer substrate having an adherent electrically conductive layer disposed thereon, said polymeric electrolyte being tightly disposed between said pair of electrodes.

77. The battery of claim 76 wherein said polymer substrate of each said electrode comprises a polymer material selected from the group of polymers consisting of PET, PP, PPS, PEN, PVDF and PE.

78. The battery of claim 77 wherein each said polymer substrate is a metallized polymer substrate having a thin metal layer as said adherent electrically conductive layer.

79. The battery of claim 78 wherein each said metallized polymer substrate is approximately 0.5 to 50 microns thick and said thin metal layer has a resistivity of approximately 0.01 to 1 ohm per square.

80. The battery of claim 79 wherein said metallized polymer substrate further comprises a first side containing a first non-metallized margin.

81. The battery of claim 80 wherein said non-metallized margin extends approximately 1 to 3 mm from an edge of said first side to an edge of said first metallization layer.

82. The battery of claim 81 further comprising a second metallization layer adhered to a second side of said polymer layer, said second side of said polymer layer comprising a second unmetallized margin extending approximately 1 to 3 mm from said edge to an edge of said second metallization layer.

83. In a polymer electrolyte battery containing at least one polymer electrolyte layer, the improvement comprising the solid state polymer electrolyte of claim 1 substituted for said at least one polymer electrolyte layer, said improvement providing a cell resistance less than or equal to that of a corresponding liquid electrolyte-containing lithium battery.

84. In a rechargeable lithium polymer electrolyte battery containing at least one polymer electrolyte layer, the improvement comprising an overcharge resistant solid state polymer electrolyte of claim 4 substituted for said at least one polymer electrolyte layer, said improvement providing a cell resistance less than or equal to that of a corresponding liquid electrolyte-containing lithium battery.

85. The improved lithium polymer battery of claim 84 wherein said battery further comprises current collectors and the improvement further comprising ultra-thin current collectors chosen from the group consisting of metallic elements less than $10\mu$ thick and metallized plastics 0.5 to $50\mu$ thick substituted for said current collectors.

86. In a thin lithium polymer electrolyte rechargeable battery comprising a pair of spaced-apart electrodes, each said electrode comprising a polymer substrate having an adherent electrically conductive layer disposed thereon, and a polymeric electrolyte disposed between said pair of electrodes, the improvement comprising substituting for said at least one electrode a flexible ultra thin film metallized polymer substrate having a polymer layer approximately 0.5–50 microns thick, a metal layer up to approximately 0.01 micron thick, and a layer of active material up to approximately 5 microns thick, and substituting for said polymeric electrolyte the solid polymer electrolyte of claim 9 in the form of a thin film up to approximately 5 microns thick.

\* \* \* \* \*